(12) United States Patent
Aharoni et al.

(10) Patent No.: US 7,640,342 B1
(45) Date of Patent: Dec. 29, 2009

(54) SYSTEM AND METHOD FOR DETERMINING CONFIGURATION OF ONE OR MORE DATA STORAGE SYSTEMS

(75) Inventors: Dan Aharoni, Brookline, MA (US);
Amnon Naamad, Brookline, MA (US);
Sachin More, Westborough, MA (US);
Kenneth Goguen, Berlin, MA (US);
Xiaoyan Wei, Shrewsbury, MA (US);
Maureen Lally, Berlin, MA (US);
Dimitar Petkov Gueorguiev, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 915 days.

(21) Appl. No.: 10/786,644

(22) Filed: Feb. 25, 2004

Related U.S. Application Data

(63) Continuation-in-part of application No. 10/259,010, filed on Sep. 27, 2002, now abandoned.

(51) Int. Cl.
| | |
|---|---|
| *G06F 15/173* | (2006.01) |
| *G06F 15/16* | (2006.01) |
| *G06F 15/177* | (2006.01) |
| *G06F 9/24* | (2006.01) |
| *G06F 1/24* | (2006.01) |
| *G06F 9/46* | (2006.01) |
| *H04J 1/16* | (2006.01) |
| *H04J 3/14* | (2006.01) |
| *H04L 12/26* | (2006.01) |
| *G06F 3/00* | (2006.01) |
| *G06F 3/048* | (2006.01) |
| *G06F 7/00* | (2006.01) |
| *G06F 17/30* | (2006.01) |
| *G06F 9/00* | (2006.01) |
| *G06F 11/00* | (2006.01) |
| *H04L 12/28* | (2006.01) |
| *H04L 12/56* | (2006.01) |
| *H04L 1/00* | (2006.01) |
| *G01R 31/08* | (2006.01) |
| *G08C 15/00* | (2006.01) |

(52) U.S. Cl. ............... 709/226; 709/222; 709/229; 709/233; 715/734; 715/735; 718/104; 713/100; 370/237; 370/395.21

(58) Field of Classification Search ............... 709/203, 709/223, 224, 226, 229, 232–235, 220–222; 370/395.21, 395.72, 230.1, 237; 715/733–736, 715/743, 747, 809, 810, 840; 707/10; 718/104, 718/105; 713/1, 2, 100
See application file for complete search history.

(56) References Cited

U.S. PATENT DOCUMENTS 5,696,901 A * 12/1997 Konrad .................. 709/203

(Continued)

OTHER PUBLICATIONS

Sanchez, L. et al. "Requirements for Configuration Management of IP-Based Networks," RFC 3139, Jun. 2001, pp. 1-11.*

(Continued)

*Primary Examiner*—Vivek Srivastava
*Assistant Examiner*—Melvin H Pollack
(74) *Attorney, Agent, or Firm*—Krishnendu Gupta; Joseph D'Angelo

(57) ABSTRACT

This invention is a system and method for configuring a data storage system based on workload, response time, or utilization requirements. The method includes the steps of receiving workload, utilization or response time data, analyzing the respective received data, determining a configuration for a data storage system which may be available in report form to a user.

16 Claims, 20 Drawing Sheets

U.S. PATENT DOCUMENTS

| | | | | |
|---|---|---|---|---|
| 5,787,254 | A * | 7/1998 | Maddalozzo et al. | 709/228 |
| 5,999,179 | A * | 12/1999 | Kekic et al. | 715/734 |
| 6,128,016 | A * | 10/2000 | Coelho et al. | 715/808 |
| 6,226,788 | B1 * | 5/2001 | Schoening et al. | 717/107 |
| 6,272,537 | B1 * | 8/2001 | Kekic et al. | 709/223 |
| 6,370,573 | B1 * | 4/2002 | Bowman-Amuah | 709/223 |
| 6,430,611 | B1 * | 8/2002 | Kita et al. | 709/223 |
| 6,449,739 | B1 * | 9/2002 | Landan | 714/47 |
| 6,564,342 | B2 * | 5/2003 | Landan | 714/48 |
| 6,636,242 | B2 * | 10/2003 | Bowman-Amuah | 715/764 |
| 6,640,278 | B1 * | 10/2003 | Nolan et al. | 711/6 |
| 6,779,030 | B1 * | 8/2004 | Dugan et al. | 709/223 |
| 6,788,315 | B1 * | 9/2004 | Kekic et al. | 715/733 |
| 6,978,259 | B1 * | 12/2005 | Anderson et al. | 706/19 |
| 6,990,667 | B2 * | 1/2006 | Ulrich et al. | 718/105 |
| 7,036,006 | B2 * | 4/2006 | Bandhole et al. | 713/1 |
| 7,050,956 | B2 * | 5/2006 | Uysal et al. | 703/6 |
| 7,065,624 | B1 * | 6/2006 | Zahavi | 711/170 |
| 7,080,140 | B2 * | 7/2006 | Heitman et al. | 709/224 |
| 7,093,005 | B2 * | 8/2006 | Patterson | 709/220 |
| 7,103,647 | B2 * | 9/2006 | Aziz | 709/220 |
| 7,133,907 | B2 * | 11/2006 | Carlson et al. | 709/220 |
| 7,143,153 | B1 * | 11/2006 | Black et al. | 709/223 |
| 7,177,270 | B2 * | 2/2007 | Sim et al. | 370/229 |
| 7,194,538 | B1 * | 3/2007 | Rabe et al. | 709/224 |
| 7,197,559 | B2 * | 3/2007 | Goldstein et al. | 709/224 |
| 7,222,147 | B1 * | 5/2007 | Black et al. | 709/200 |
| 7,231,430 | B2 * | 6/2007 | Brownell et al. | 709/218 |
| 7,266,595 | B1 * | 9/2007 | Black et al. | 709/223 |
| 7,278,142 | B2 * | 10/2007 | Bandhole et al. | 718/104 |
| 7,282,063 | B2 * | 10/2007 | Cohen et al. | 623/17.13 |
| 7,287,063 | B2 * | 10/2007 | Baldwin et al. | 709/216 |
| 7,290,056 | B1 * | 10/2007 | McLaughlin, Jr. | 709/230 |
| 7,315,826 | B1 * | 1/2008 | Guheen et al. | 705/7 |
| 7,356,452 | B1 * | 4/2008 | Naamad et al. | 703/22 |
| 7,430,593 | B2 * | 9/2008 | Baldwin et al. | 709/223 |
| 2002/0052941 | A1 * | 5/2002 | Patterson | 709/223 |
| 2002/0059274 | A1 * | 5/2002 | Hartsell et al. | 707/100 |
| 2002/0065864 | A1 * | 5/2002 | Hartsell et al. | 709/100 |
| 2002/0091746 | A1 * | 7/2002 | Umberger et al. | 709/105 |
| 2002/0152305 | A1 * | 10/2002 | Jackson et al. | 709/224 |
| 2002/0158899 | A1 * | 10/2002 | Raymond | 345/736 |
| 2002/0161566 | A1 * | 10/2002 | Uysal et al. | 703/21 |
| 2002/0198985 | A1 * | 12/2002 | Fraenkel et al. | 709/224 |
| 2003/0046380 | A1 * | 3/2003 | Steger et al. | 709/223 |
| 2003/0055932 | A1 * | 3/2003 | Brisse | 709/223 |
| 2003/0055972 | A1 * | 3/2003 | Fuller et al. | 709/226 |
| 2003/0079019 | A1 * | 4/2003 | Lolayekar et al. | 709/226 |
| 2003/0135609 | A1 * | 7/2003 | Carlson et al. | 709/224 |
| 2003/0135638 | A1 * | 7/2003 | Brabson et al. | 709/232 |
| 2003/0145086 | A1 * | 7/2003 | O'Reilly | 709/226 |
| 2003/0225876 | A1 * | 12/2003 | Oliver et al. | 709/224 |

OTHER PUBLICATIONS

Volz, B. et al. "DHC Load Balancing Algorithm," RFC 3074, Feb. 2001, pp. 1-10.*

Eder, M. et al. "Considerations from the Service Management Research Group (SMRG) on Quality of Service (QoS) in the IP Network," RFC 3387, Sep. 2002, pp. 1-19.*

Nichols, K. And Carpenter, B. "Definition of Differentiated Services Per Domain Behaviors and Rules for their Specification," RFC 2086, Apr. 2001, pp. 1-24.*

Shenker, S. et al. "Specification of Guaranteed Quality of Service," RFC 2212, Sep. 1997, pp. 1-20.*

White, K. "Definitions of Managed Objects for Service Level Agreements Performance Monitoring," RFC 2758, Feb. 2000, pp. 1-71.*

* cited by examiner

FIG. 18

User Data — 382
380
384 — Application Workload
Total I/O Rate: 5000.00
Total MB/sec: 93.75
386 — Load level (heavy load — light load)

|  | Read Hit | Read Miss | Sequential Read | WP Write (re-write) | LRU Write | | RA-2 RDF LOAD | WP Write (re-write) | LRU Write |
|---|---|---|---|---|---|---|---|---|---|
| ○ % of I/O Rate | 20 | 45 | 10 | 0 | 25 | | 0 | 0 | 0 |
| ● I/O Rate | 1000.00 | 2250.00 | 500.00 | 0.00 | 1250.00 | | 0.00 | 0.00 | 0.00 |
| MBytes/Sec | 7.81 | 17.58 | 31.25 | 0.00 | 37.11 | | 0.00 | 0.00 | 0.00 |
| I/O Size (kB) | 8.00 ▶ | 8.00 ▶ | 64.00 ▶ | 0.00 ▶ | 30.40 ▶ | | 0.00 ▶ | 0.00 ▶ | 0.00 ▶ |

390 — Application Type: OLTP2 (similar to Oracle) ▶
392 — # BCV disks: 0
388 — Recommend Cabinet
394 — OK

FIG. 19

396
398 — Recommendation
Cabinet Recommendation
Usable Capacity (TB): 16
Minimum # of Hosts (Ports): 16
400
402 — Recommend
404 — Cancel

SYSTEM AND METHOD FOR DETERMINING CONFIGURATION OF ONE OR MORE DATA STORAGE SYSTEMS

RELATED APPLICATIONS

The application is a continuation-in-part of U.S. patent application Ser. 10/259,010 filed on Sep. 27, 2002 now abandoned entitled "Method of Using Simulation Data for Capacity Planning and Configuring One or More Data Storage Systems," and which is incorporated herein in its entirety by this reference. This application is related to co-pending U.S. patent application Ser. 10/259,011 filed Sep. 27, 2002 and entitled "System and Method for Simulating Performance of One or More Data Storage System," and which is assigned to the same assignee as this application. Additionally, this application is also related to co-pending U.S. patent application Ser. No. 10/786,965 to Dan Aharoni et al. entitled "System and Method for Simulating Performance of one or more Data Storage Systems with Utilization Input" filed on even date with this application and is assigned to the same assignee as this application.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to managing and analyzing data in a data storage environment, and more particularly to a system and method for simulating performance in such an environment.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. Mass storage systems particular those of the disk array type have centralized data as a hub of operations all driving down costs. But performance demands placed on such mass storage have increased and continue to do so.

Design objective for mass storage systems include cost, performance, and availability. Objectives typically include are a low cost per megabyte, a high I/O performance, and high data availability. Availability is measured by the ability to access data. Often such data availability is provided by use of redundancy such as well-known mirroring techniques.

One problem encountered in the implementation of disk array data storage systems concerns optimizing the storage capacity while maintaining the desired availability and reliability of the data through redundancy. It is important to allocate as closely as possible the right amount of storage capacity with going over or under significantly because of cost and necessity but this is a complex task. It has required great deal of skill and knowledge about computers, software applications such as databases, and the very specialized field of data storage. Such requisite abilities have long been expensive and difficult to access. There remains and probably will be an increasing demand for and corresponding scarcity of such skilled people.

Determining the size and number of disk array or other data storage system needed by a customer requires information about both space, traffic and a desired quality of service. It is not sufficient to size a solution simply based on the perceived quantity of capacity desired, such as the number of terabytes believed to be adequate.

In addition to general capacity planning problems with data storage systems other complexities may arise. One such complexity arise when there is an interest in merging existing data storage systems with newer or fewer data storage systems. Such consolidation helps a customer reduce operating costs by decreasing the number of storage systems, and migrating the data to fewer and/or newer, larger capacity, more efficient storage systems. Consolidation may be of interest for some of the following reasons: saving footprint space; reducing the cost of utilities; simplifying management and reducing management costs; reducing hardware inventory costs; and upgrading to new technology. On the other hand there are costs associated with such a change and there is need for a simple tool to allow for the analysis of such a change and to determine an optimum solution, and in particular with regard to performance requirements and desired characteristics.

There is a long-felt need for a computer-based tool that would allow a straight-forward non-complex way to allocate proper storage capacity while balancing cost, growth plans, workload, and performance requirements and further if such a tool would be useful for analyzing consolidation or merging operations. This would be advancement in the computer arts with particular relevance in the field of data storage.

SUMMARY OF THE INVENTION

To overcome the problems described above and to provide the advantages also described above, the present invention is a system and method for configuring a data storage system based on workload, response time, or utilization requirements. In one embodiment the method includes the steps of receiving workload, utilization or response time data, analyzing the respective received data, determining a configuration for a data storage system which may be available in report form to a user.

In an embodiment of a system a computer with display and memory are configured with computer-executable program logic capable of performing steps similar or identical to those described above with reference to the embodiment of the method.

In another embodiment, a program product includes a computer-readable medium having code included on the medium configured to carry out computer-executed steps that are similar or identical to those described above with reference to the embodiment of the method.

BRIEF DESCRIPTION OF THE DRAWING

The above and further advantages of the present invention may be better under stood by referring to the following description taken into conjunction with the accompanying drawings in which:

FIG. 18 shows an exemplary user data screen showing user data including user data input fields;

FIG. 19 shows another exemplary user data screen showing user data including user data input fields;

DETAILED DESCRIPTION OF THE PREFERRED EMBODIMENT

The methods and apparatus of the present invention are intended for use with data storage systems, such as the Symmetrix Integrated Cache Disk Array system available from EMC Corporation of Hopkinton, Mass. Specifically, this invention is directed to a method and system for simulating performance of one or more data storage systems and which may be useful for applications such storage capacity planning, performance analysis, and problem and fault isolation in a storage environment design.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The program code (software-based logic) for carrying out the method is embodied as part of the system described below beginning with reference to FIG. 1. One aspect of the invention is embodied as a method that is described below with reference to FIGS. 3-6. User Interface Screens for using the invention are shown in FIGS. 7-14.

Figure 1:
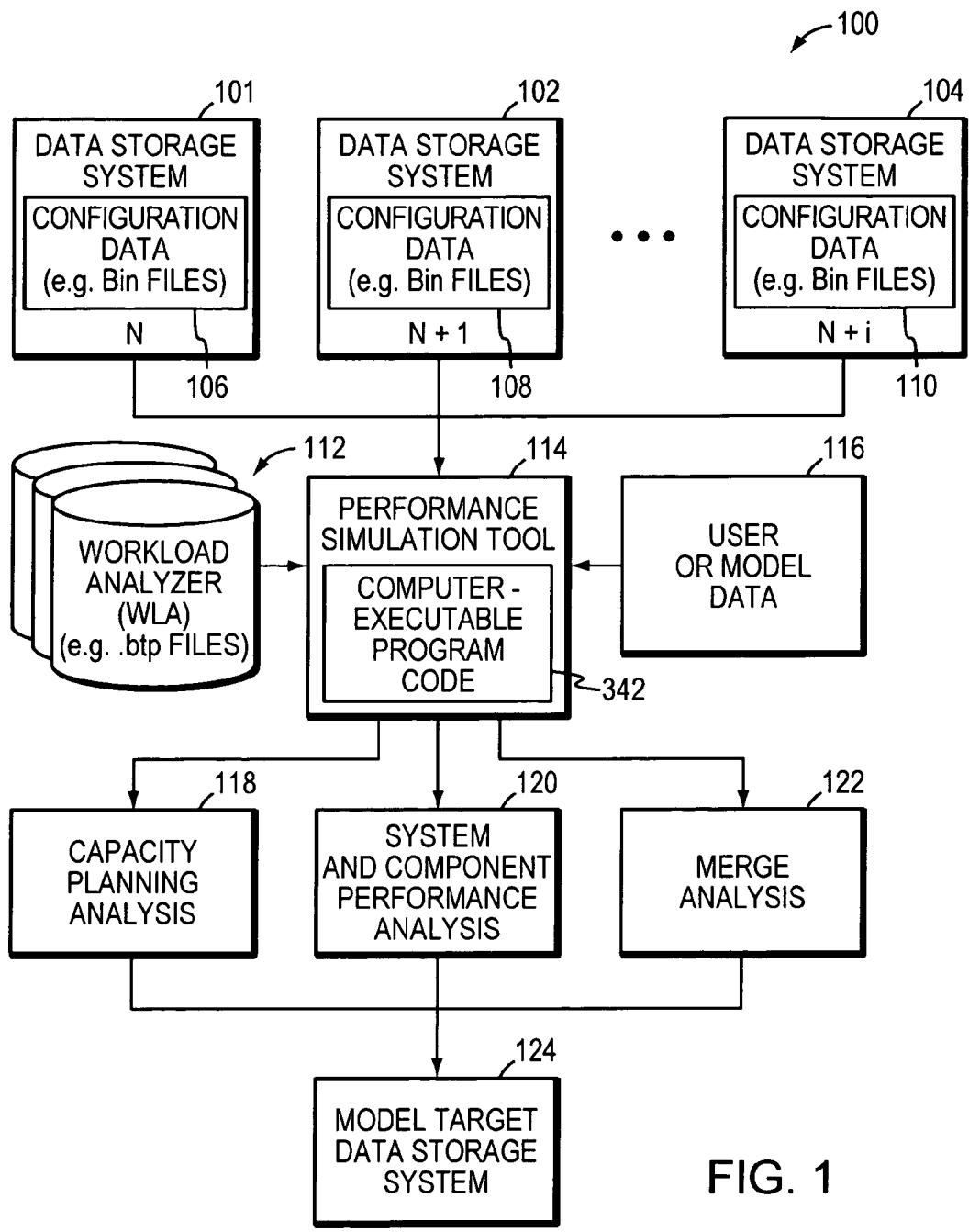
FIG. 1 is a block diagram of a data storage environment including a performance simulation system configured for carrying out method steps of this invention.

Referring now to FIG. 1, reference is now made to a network or local system 100 for which the invention is particularly useful and typically includes a plurality of data storage systems, such as data storage system 100, 102, and 104. The data storage systems are useful if the simulation system tool 114 including computer-executable program code 342 is to use configuration data 106, 108, and 110 of the respective data storage systems in conjunction with workload characteristics form the preferred workload analyzer 112 files (.btp format available as part of EMC's ECC software program; EMC Corporation is based in Hopkinton, Mass.). However optionally, the simulation tool 114 may use user or model data 116 if there are not specific data storage systems (generally n-n+i) to be merged into fewer systems than n+1, e.g., target or model data storage system 124. The target system 124 may also be derived from the user of model data operated on by the data storage simulation tool using the workload files 112, to yield a capacity planning analysis 118, a system and component performance analysis. The merge analysis 122 specifically envisions the need to merge the n+1 storage systems into a target system.

The simulation system or tool preferably uses software 342 for carrying out the method steps described in method steps shown in FIGS. 2-6 and may work on a general purpose digital computer turning such a computer into a special purpose computer comprising an apparatus for carrying out the processes of this invention. The software may be used with any type of data storage system but has been used with a preferred EMC Symmetrix system and may also be used with an EMC Clariion data storage system as well as those of other manufacturers. For exemplary purposes an EMC data storage system is described in the method steps and in conjunction with the user interface screens shown in FIGS. 7-14.

As has been stated, in a preferred embodiment the data storage system to be configured is a Symmetrix Integrated Cache Disk Arrays available from EMC Corporation of Hopkinton, Mass. However, it will be apparent to those with skill in the art that there is no limit to the use of this invention for any system including data storage. Nevertheless, regarding the preferred embodiment, such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

Generally a Symmetrix data storage system includes a system memory and sets or pluralities and of multiple data storage devices or data stores. The system memory can comprise a buffer or cache memory; the storage devices in the pluralities and can comprise disk storage devices, optical storage devices and the like. However, in a preferred embodiment the storage devices are disk storage devices. The sets represent an array of storage devices in any of a variety of known configurations.

In such a data storage system, a computer or host adapter provides communications between a host system and the system memory and disk adapters and provides pathways between the system memory and the storage device pluralities. Regarding terminology related to the preferred Symmetrix system, from the host adapter toward the computer or host is sometimes referred to as the front end and from the disk adapters toward the disks is sometimes referred to as the back end. A bus interconnects the system memory, the host adapters and the disk adapters. Although not shown such a bus could be used with switches to provide discrete access to components of the system.

Each system memory is used by various elements within the respective systems to transfer information and interact between the respective host adapters and disk adapters. A service processor may also be used in communication with system memory particularly for maintenance, service needs, and collection of performance data. The service processor is typically a well-known laptop computer, i.e. a general-purpose digital computer, but which may be outfitted with the software-driven simulation system 114 of this invention to comprise a special purpose digital computer for carrying out the processes of this invention.

The simulation system or tool 114 may be used to determine the feasibility of consolidating a number of storage systems to fewer or newer data storage system units, this is sometimes referred to as a "merge" operation. The tool is useful for examining and calculating the utilization of components within the system to be consolidated or merged, such a system may be referred to as a source for a consolidating or merging operation. The tool may also be used to evaluate the performance of a number of different workloads on one or more data storage systems, including a system for which others are merged into, which may be referred to as a target configuration or system. When the tool is used for planning purposes the optimum system derived from the analysis may also be the target system even though no merge operation may be planned, and in such a case user desired performance data may be used to arrive at such a target.

The tool 114 helps to define consolidation mapping and evaluates whether this mapping is favorable for a new upgrade data storage system in terms of performance. The tool may be further used to examine the utilization of components within the new target data storage system and generates a near optimal file (e.g. binary file) that can be used for such a configuration.

All the utilization and calculations are based on modeling the internal operations and processes inside the target data storage system. The accuracy of the calculations is based on the accuracy of the input workload, which is discussed in more detail below. If the workload changes, this evaluation may change significantly. The tool 114 analyzes the utilization of components, as well as the entire system, and may be used for considering workloads from data storage systems being used with Open Systems host computers and Mainframe host computer systems using proprietary schemes.

Figure 14:
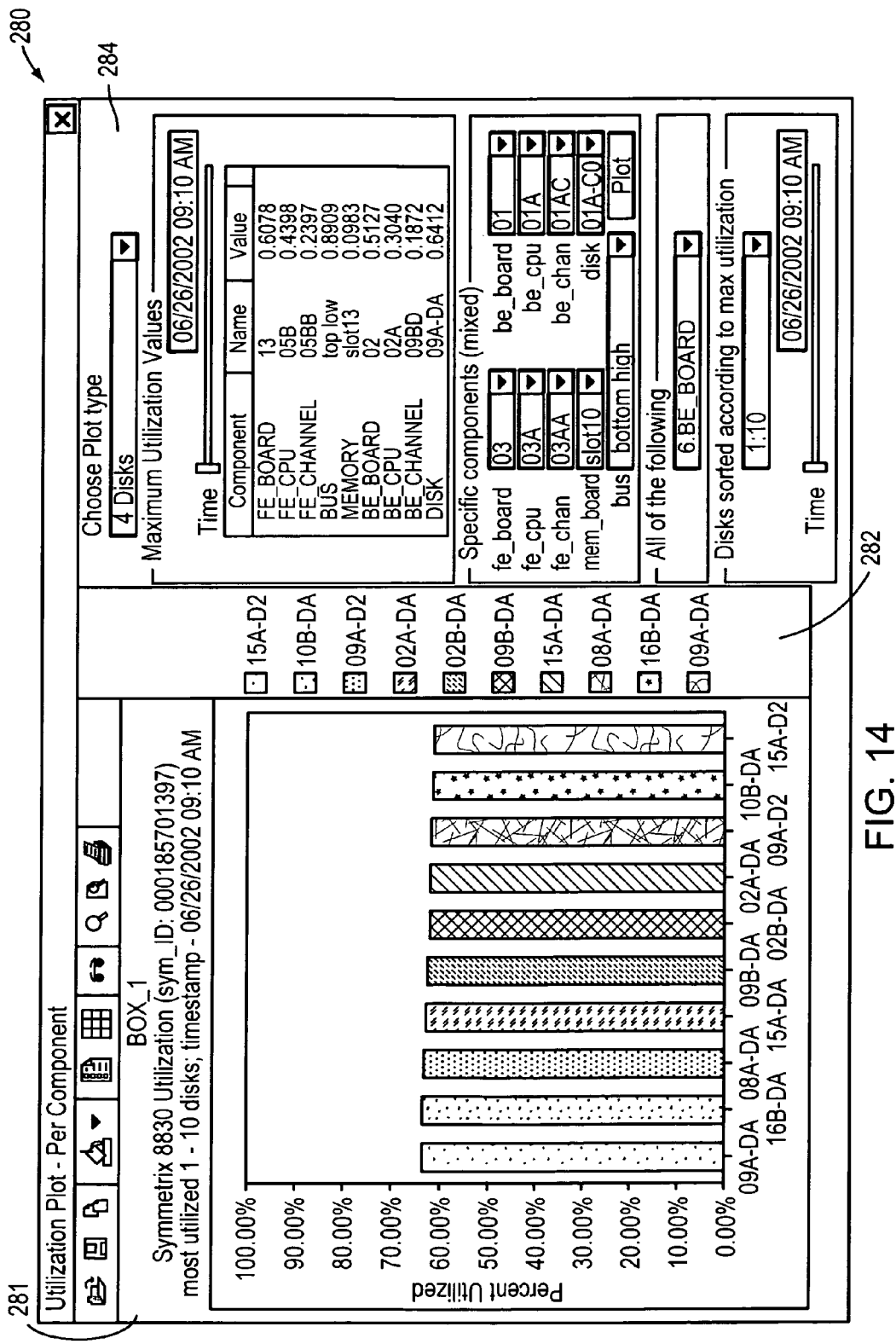
FIG. 14 is another exemplary representation of a user interface screen for using this invention.
Figure 15:
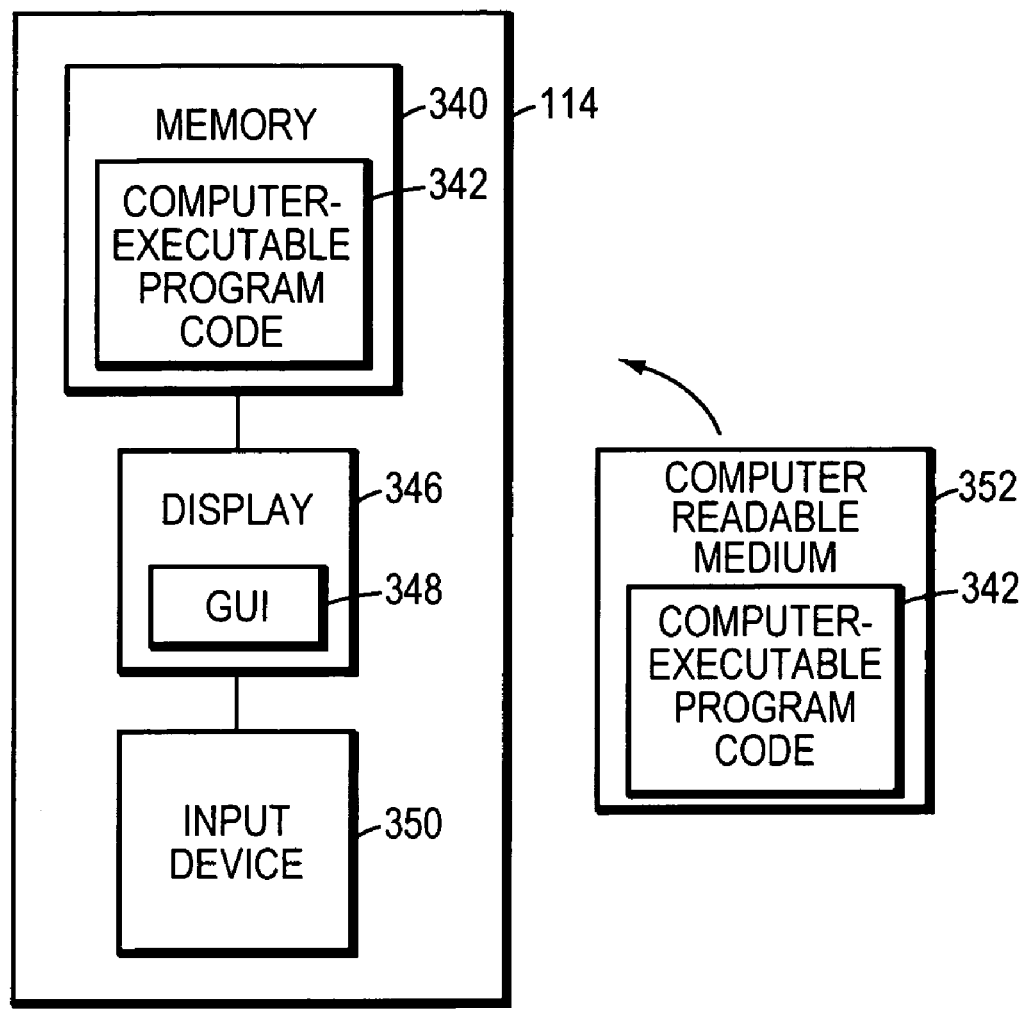
FIG. 15 shows the performance simulation tool of FIG. 1 including the computer-executable program code of the preferred embodiment and including a computer-readable medium encoded with the computer-executable program code for enabling the method of the present invention.

FIG. 15 shows a tool 114 as generally including a general purposed digital computer including memory 340 (e.g., conventional electronic memory) in which is stored computer-executable program code 342 that enables the method of the invention (FIGS. 2-6) and enables display of user screens (FIGS. 7-14) on display 346 to comprise GUI 342. The general-purpose digital computer becomes a specialized unique and novel machine because of the code or logic 342, which in a preferred embodiment is software but may be hardware. Logic or code 342 may also be stored and read for operation on computer readable medium 352. A user input device 350, such as a well-known mouse or keyboard allows the user to interface with the computer including its special logic.

An Embodiment of Method Steps of the Invention

Now for a better understanding of an embodiment of method steps of this invention the steps are described in detail with reference to FIGS. 3-6, which are explained with reference to user interface display screens shown in FIGS. 7-14.

Figure 2:
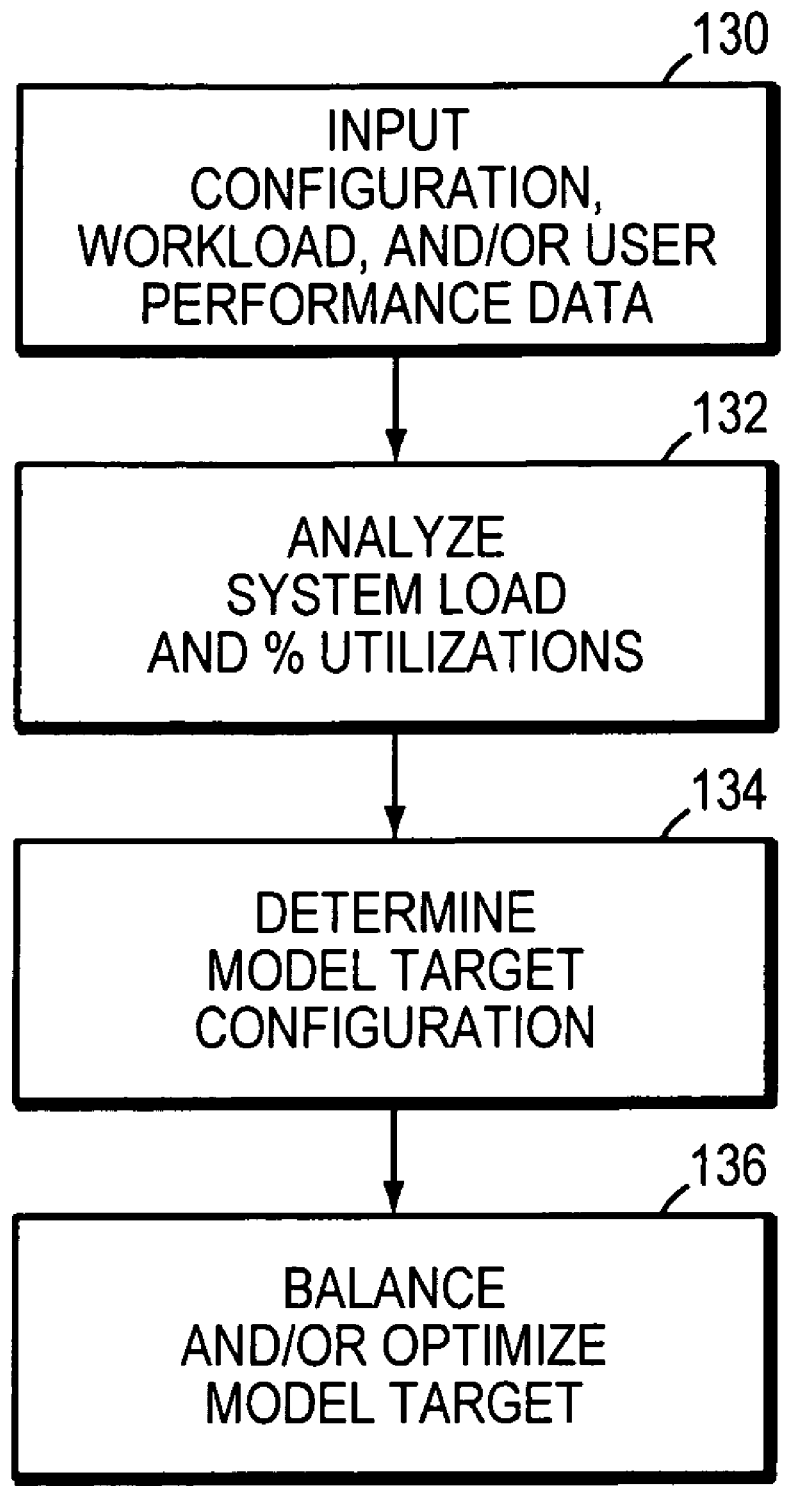
FIG. 2 is a flow logic illustrating an overview of an embodiment of method steps of this invention carried out by the performance system of FIG. 1.
Figure 3:
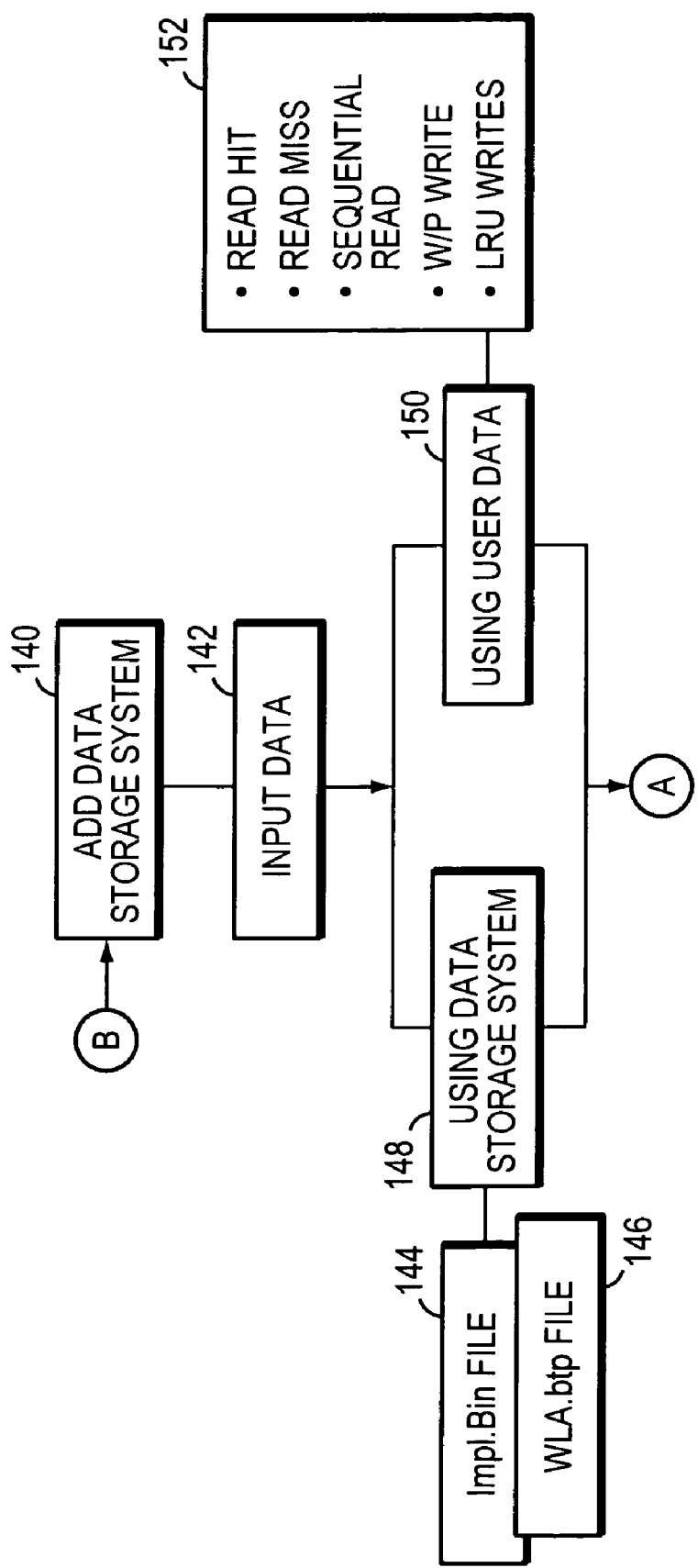
FIG. 3 is a flow logic diagram further showing illustrating the embodiment of method steps shown in FIG. 2.

Referring to FIG. 2, an overview of the method steps of simulation is shown, wherein the simulation action may include some or all of the steps shown. In step 130 input is given by a user or under computer control for configuration, workload, and/or user performance data. In step 132, the simulation tool 114 analyzes the system load and percent (%) utilization of each component in the system. Percent utilization refers to the amount of time a component or system is working versus its respective idle time. Using the analysis model target configurations can be determined in step 132 and the load may be balanced and/or the model target optimized for performance in step 136. Specifically how the general steps are carried out depend on the objectives of the user, i.e. using the tool for merging of two or more data storage systems or performance analysis for optimization or capacity planning or fault isolation and general design purposes. Other uses for the tool may occur to those skilled in the are in view of the teachings herein, and such uses should not limited except by the claims appearing herein and their equivalents, which may not be presently foreseeable.

Figure 4:
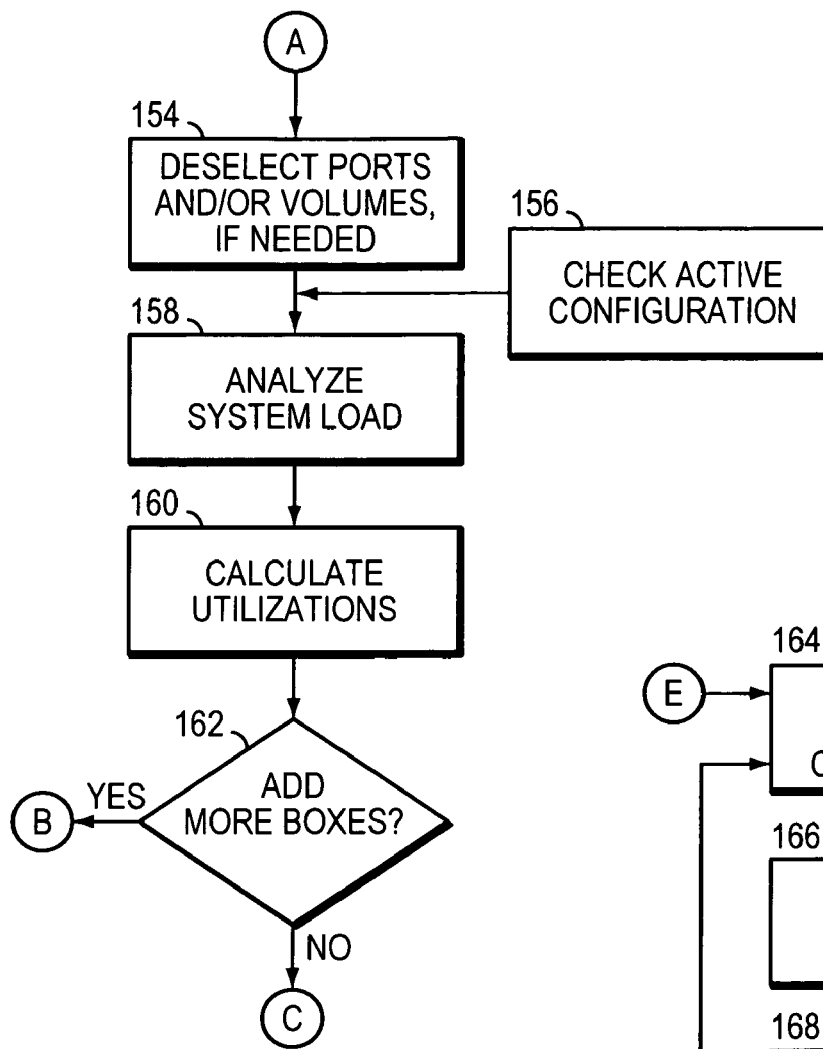
FIG. 4 is another flow logic diagram further showing illustrating the embodiment of method steps shown in FIG. 2.
Figure 5:
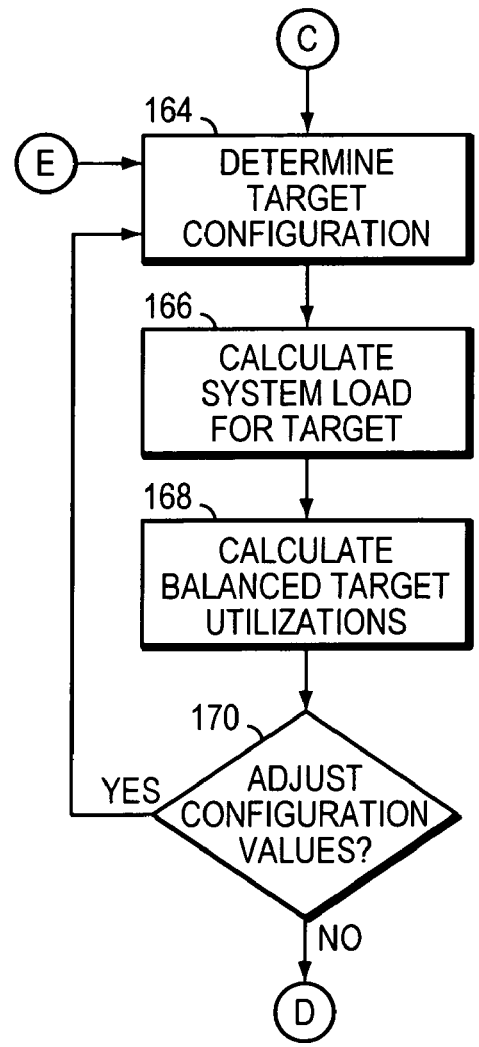
FIG. 5 is another flow logic diagram further showing illustrating the embodiment of method steps shown in FIG. 2.
Figure 6:
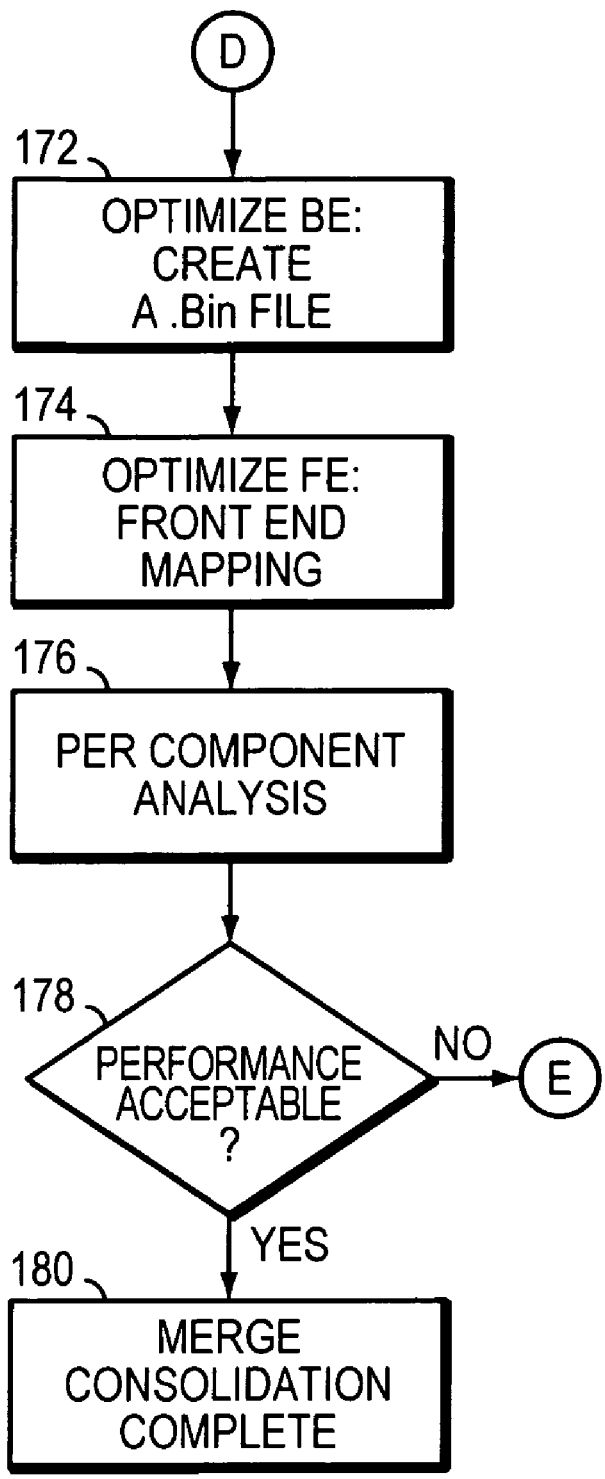
FIG. 6 is another flow logic diagram further showing illustrating the embodiment of method steps shown in FIG. 2.

Reference is made below to FIGS. 3-6, more specific roadmap type of method steps for employing this invention are given and are best understood with reference to user screens shown in FIGS. 7-14. In FIG. 6, step 140 is directed toward "Add Box," which means determine whether a data storage system is to be merged, and if so its configuration data is added in step 142. The configuration data available from cache of the preferred Symmetrix or a service processor in communication with the data storage system is typically a binary (.bin) file that is added in step 142, and workload characteristics may be also loaded from the preferred EMC ECC Workload Analyzer (a .btp format) file in step 146. Alternatively if using user data in step 150, the workload characteristics desired, predicted, or needed based on the type of applications being processed on the data storage system can be added. For a particular data storage system, and for each type of I/O, the simulation tool 114 maintains a database of each component's execution, including factors such as time of execution and operation executed on each such component.

Performance characteristics such as IO operations are considered that include number of read hits, read misses, sequential reads, least recently used writes (i.e., re-writes), and write pending operations. A write operation means data is requested to be placed on the disk whereas a read operation means data is requested to be viewed but not changed and typically this involves loading from disk or electronic memory such as cache. Such cache or system memory is often employed to avoid mechanical lags associated with actual disk reads or writes. A random read hit means that data requested to be read from a random request was found in cache. On the other hand a random read miss means the data was not found in cache in response to a similar request. Sequential reads refers to a situation where a read request following an immediate preceding request is for data stored on disk in an immediately following sequence such as a data block. In such a case, cache can be used quite effectively to avoid going to disk, e.g., by pre-fetching a certain amount of sequentially arranged data from disk into cache. Least Recently Used writes (LRU writes) refer to regular writes to cache, which require standard LRU management. Write Pending writes (WP writes) refer to writes which are written into write pending (WP) slots in cache, which enable a more efficient write operation in terms of resource usage. An example of WP writes are cases where the same address in written and re-written a number of times over and over.

Whether using data storage system data (step 148) or user data (step 150), continuation step a flows into identical continuation step a shown on FIG. 4, and which in turn flows into step 154. In step 154, the user may deselect ports and/or volumes, which will decrease the workload on the data storage system, this may be done using the user interface screens described with reference to FIGS. 7-14 below. In step 156, the user may then check the check active configuration after such an action for meeting requirements, and then the system performance simulation system or tool can analyze system load in step 158 and calculate utilizations in step 160. If more boxes are to be added into a merge then the answer is "YES," to the query posed in the interrogatory step 162, and continuation Step B flows back into Step 140 of FIG. 3, and a loop of steps 140-162 repeats until the answer to the question is "No," and processing flows into continuation Step C which in turn flows to FIG. 5.

Referring now to FIG. 5, after continuation Step C, the target configuration many is determined in Step 164. The system load for the target is calculated in Step 166, and a balanced target utilization is calculated in Step 168, so that if needed configuration values may be adjusted in step 170. If the values are to be adjusted ("yes," to the query of Step 170, then processing flows to continuation step E which in turn flows to Step 164 and the steps 164-170 are repeated until the query answer is "No." In such case, processing flows to continuation Step D and then to FIG. 6.

Referring to FIG. 6, following Continuation Step D, in a preferred embodiment, the back end of the target storage system may be optimized, creating a binary file in Step 172 and the front end similarly optimized in Step 174. Then a component analysis in Step 176 will identify any problem components or areas, which will be further explained with reference to FIGS. 11-14 below. If the performance is acceptable, or the query posed in step 178, then the merge consolidation is considered complete in step 180, but if not then continuation E is followed to return processing back to Step 164 (FIG. 5) and a loop continues through to Step 178 until the performance is deemed acceptable. Techniques for increasing performance and in accordance with the steps above include reconfigure the data storage system to have more resources, or 'faster' components, such as Fiber channel and over the well-known SCSI interfaces.

Figure 7:
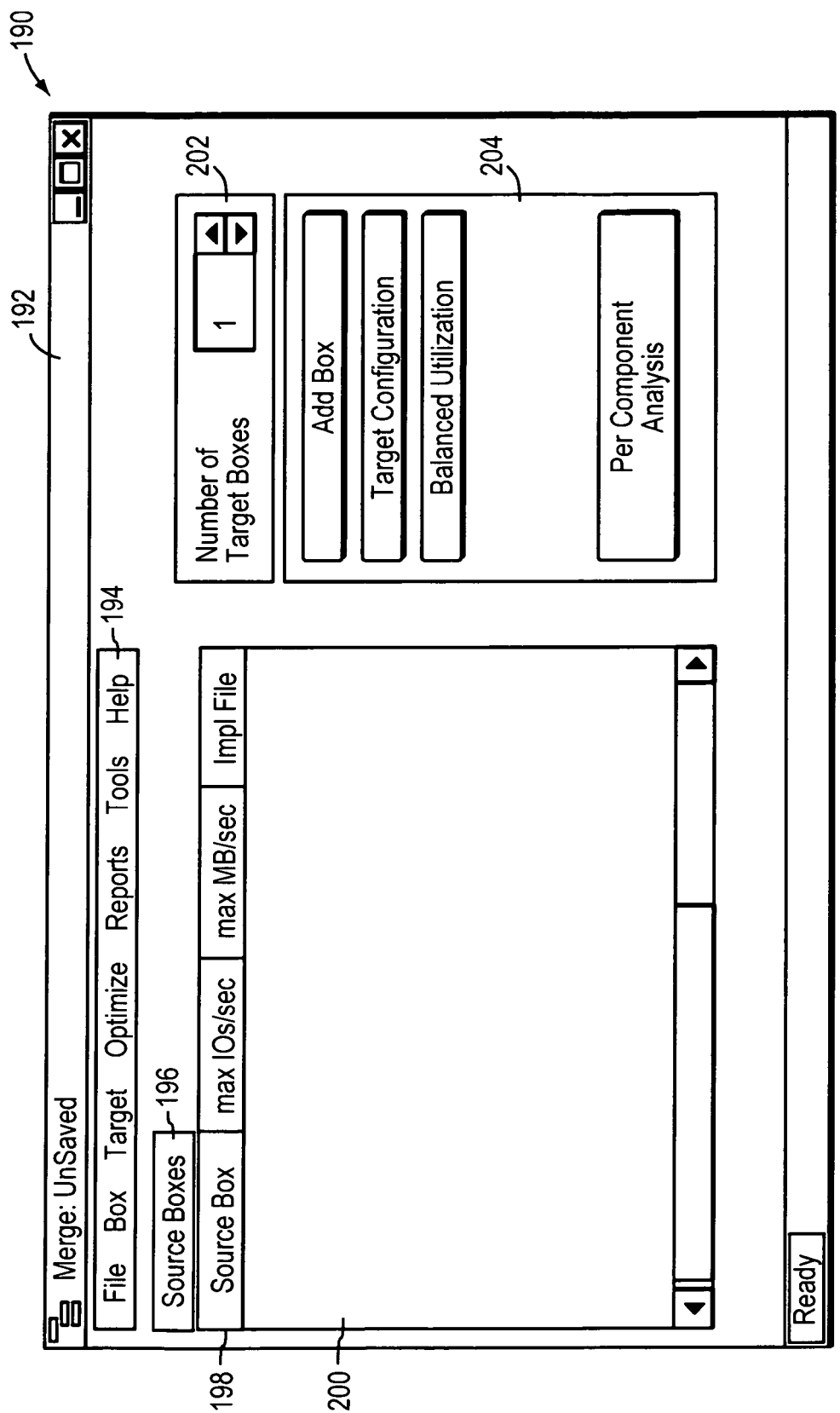
FIG. 7 is an exemplary representation of a user interface screen for allowing use of this invention.

Example of user interface screens for carrying out some or all of the method steps described above are shown in FIGS. 7-14. Referring to FIG. 7, screen 190 including menu action bar 192 with user actions 192 (e.g., file, box, target, optimize, reports, tools, and help) is presented for a user who wishes to merge or consolidate data storage systems as described above. Clicking on the "Source Boxes" field 196, presents user information area 198, including "Source Box," "Max Ion's/sec, "max MB/sec," and may also contain other performance characteristics fields (not shown for simplicity). A message area 200 is available for conveying related information to a user. The user may specify the number of target boxes for the merge in field 202. Field area 204, inclusively has several action field buttons including "Add Box," "Target Configuration," "Balanced Utilization," and "Per Component Analysis."

Figure 8:
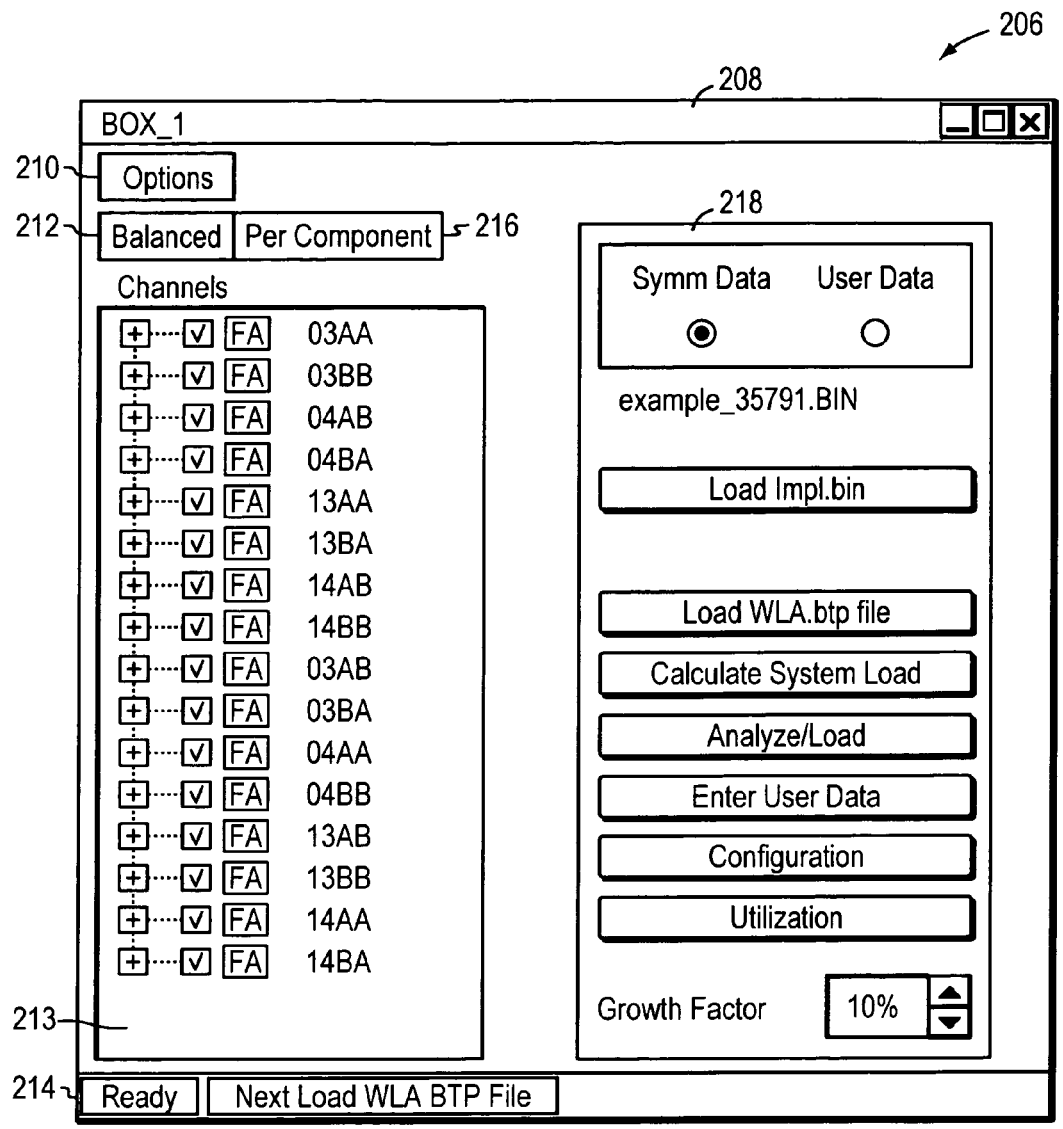
FIG. 8 is another exemplary representation of a user interface screen for allowing use of this invention.

In FIG. 8, an example screen 206 is shown. Once a user has made a particular box selection identified in field area 208 (in this example "Box_1") the type of desired action may be chosen using the Options button 210. Field area 212 shows a balanced option selected to a current system for consolidation (the volumes included are shown in the message area) 213. Field area 218 allows selection of whether a data storage system data (e.g. Symmetrix or Seem Data) or user data, and then a selection of a configuration binary file to load. Other actions selectable in user area 218 include "Load WLA btp file," wherein performance characteristics are selected from the preferred WLA file as described above. Other user-selectable actions include "Calculate System Load," "Analyze Load," "Enter User Data," "Configuration," and "Utilization." The user may also estimate the amount of growth expected, e.g. 10%.

Figure 9:
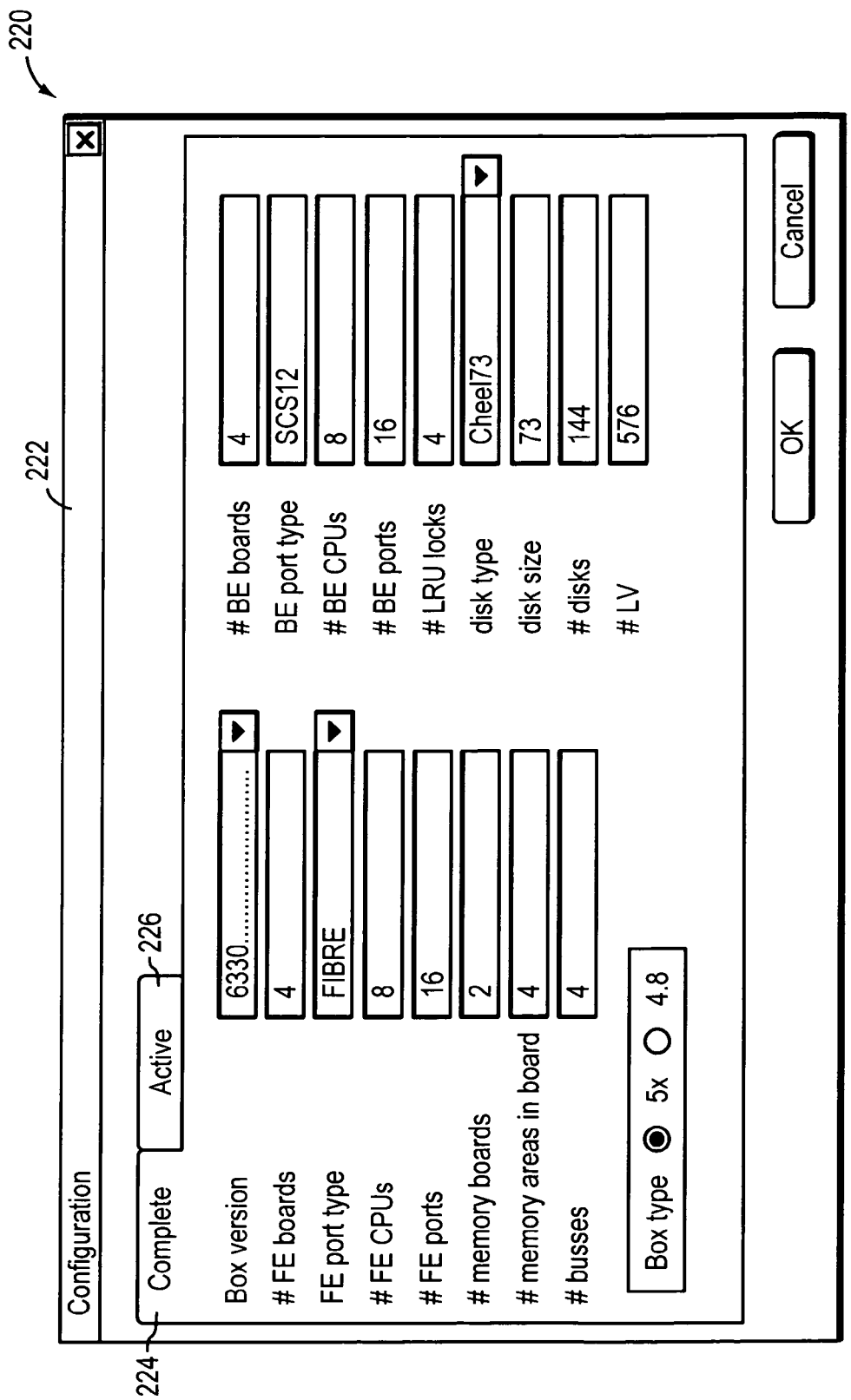
FIG. 9 is another exemplary representation of a user interface screen for allowing use of this invention.

FIG. 9 shows a user interface screen 220 useful for checking and adjusting a configuration of a data storage system, either the target system on one under investigation. Conveniently, there are two action tabs provided in the screen window: "Complete" tab 224 and "Active" tab 226. The Complete tab displays the configuration found in the preferred Impl.bin file and displays the configuration of the entire system. A "Box Type" tab in the presented window area of tab 224 allows the user to select the appropriate data storage system type, e.g., the example Symmetrix 5× or Symmetrix 4.8 type systems. Selecting the appropriate system allows the simulation tool 114 to adjust the resources to reflect the user's choice. For example, the number of logical volumes (#LVs) in the complete window shows the total number of logical volumes in the box, whether or not they are mapped to the back end in the preferred example Symmetrix data storage system.

Figure 10:
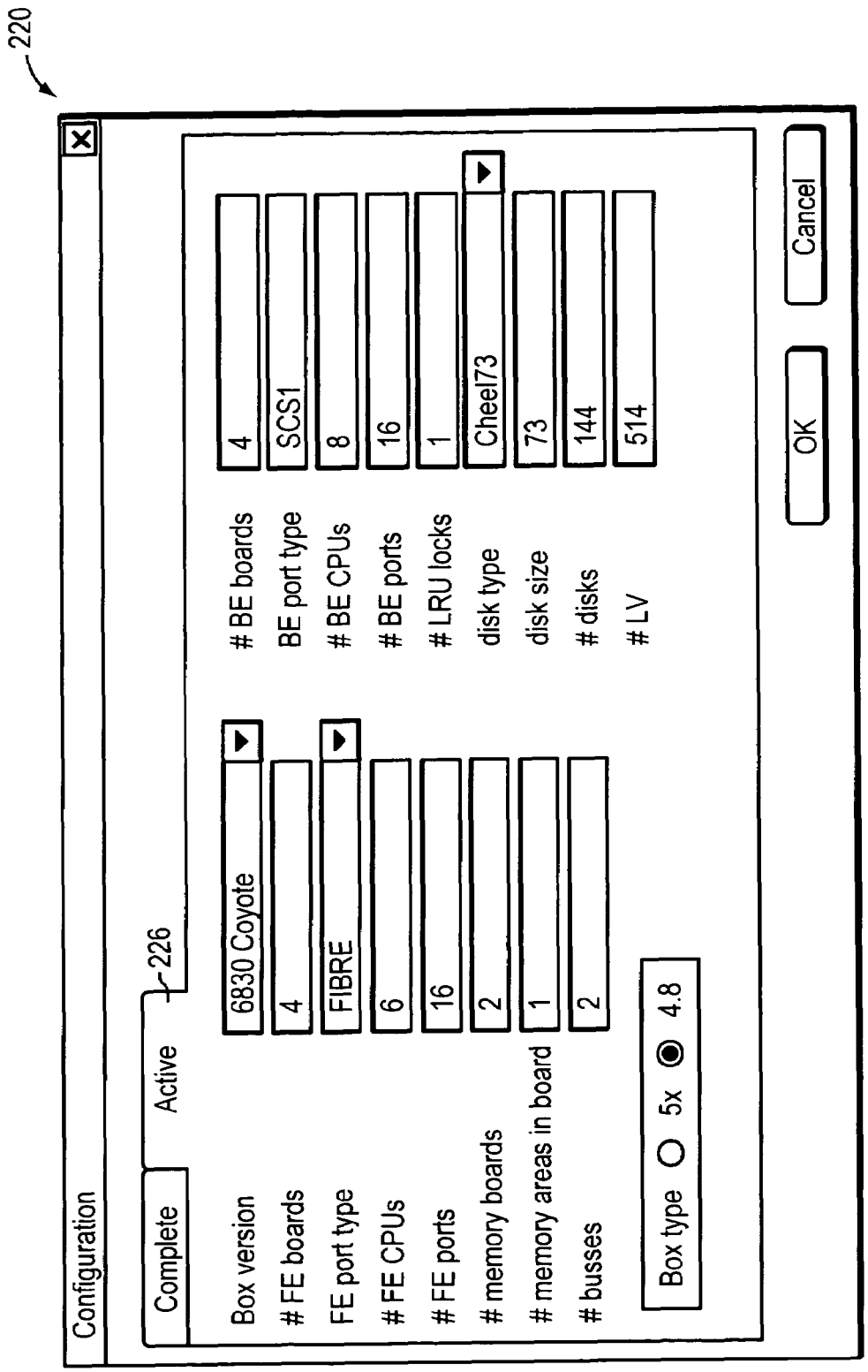
FIG. 10 is another exemplary representation of a user interface screen for allowing use of this invention.

FIG. 10 shows the window presented on screen 220 when the Active configuration tab is selected. This window displays only the active resources (e.g., channels/logical volumes) a user has selected, and takes into account only the active resources chosen. The number of logical volumes (#LVs) in the Active window shows only the number of active logical volumes (those that contribute to the system load). Other information is also presented which one skilled in the art will recognize that in combination with the method steps and the system overview presented above provides an advancement in the computer arts. This invention is not to be limited by the examples given, but only by the claims are their equivalents, some of which may not be foreseeable at present.

Figure 11:
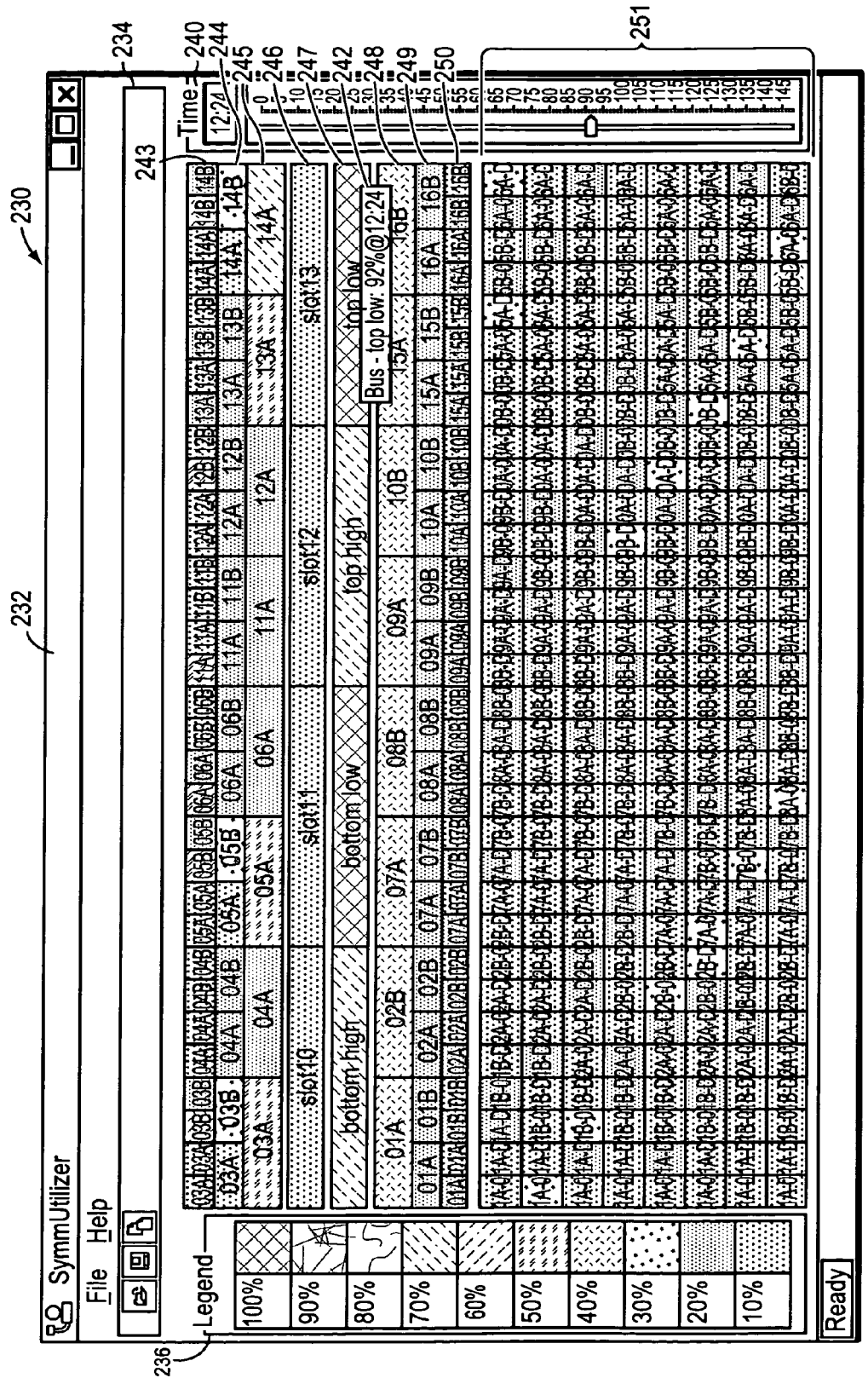
FIG. 11 is another exemplary representation of a user interface screen for allowing use of this invention.

FIG. 11 shows a component analysis map screen 230 of an entire data storage system. The tool 114 enables a user to view utilization of each component in a source or target data storage system. The option is provided to view in graphical (FIGS. 12 and 13, discussed below) or map format (FIG. 11). The mapped view represents the maximum utilization of each component over all the timestamps or per a particular timestamp (i.e. point in time). A title area 232 and action menu bar area 234 serve to respectively inform and allow the user to interact in conventional ways of Windows based software. However, the rest of the mapped view presents a completely novel way for a user to explore the utilization and potential problems of a target or current data storage system. Area 238 generally shows the utilization of each component, which is color coded, e.g. using red to identify over-used components (shown here in FIG. 11, as graphically coded due to lack of color drawings used herein) to a usage chart shown in Legend area 236. A timestamp area 240 allows the user to look at usage over any selected time.

Generally, regarding identification of components in the presented window of screen 230, the following applies, for this example. Presented from top to bottom on screen 230 (FIG. 11) are: area 243: front-end ports; area 244: front-end CPUs; area 245: front-end boards (i.e. the components on board to the bus; area 246: memory boards; area 247: buses; area 248: back-end boards; area 249: back-end CPUs; area 250 back-end ports; area 251: physical disks identified by volume id's. This example is of course for the preferred exemplary case of an EMC Symmetrix Data Storage System. However, one skilled in the art will recognize the general mapping scheme would apply to any data storage system other than the exemplary case.

Returning to the exemplary case shown in FIG. 11, when a mouse cursor is moved over a component screen representation, e.g. example component screen representation 242 in general screen area 247 the utilization is shown presented on the screen for the user to read. In the presented example, The Bus-top low: is being used at 92% utilization at the time 12:24. This implies alarmingly high traffic and alerts a user of potential problem areas to address for the target or current system. It should be understood, that the invention enables, although not shown in the drawings simple text messages (not shown) related to utilization or other performance considerations. Also, a user can simply tell a lot by glancing at the easy to read map, e.g. many disk drives, e.g. volume 1A-0 are being under-utilized, 10% in the example, while others, e.g. volume 9A-0 are being used at a good rate of about 40%. Thus, the invention, along with its other advantages, is also useful for determining utilization of each component in a system and for determining utilization of a system itself, whether the system is being currently employed or is one being simulated, or modeled, for design purposes or for consolidation or capacity planning or general performance analysis. Moreover, the simplicity of using the tool 114 allows those with simple skills in the computer area to make well-reasoned decisions regarding data storage, heretofore, an area requiring complex skills and a wealth of hard-earned experience.

Figure 12:
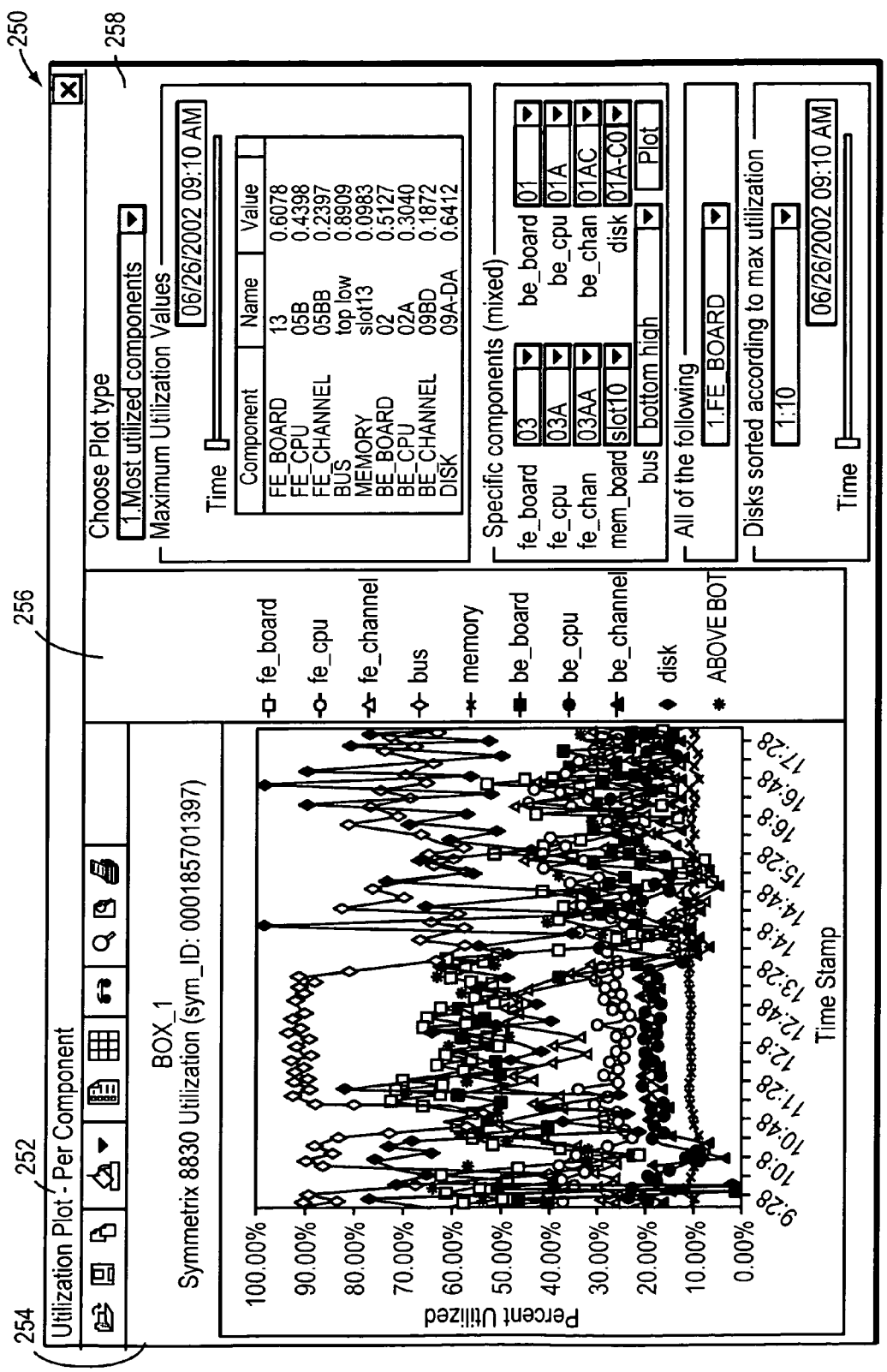
FIG. 12 is another exemplary representation of a user interface screen for allowing use of this invention
Figure 13:
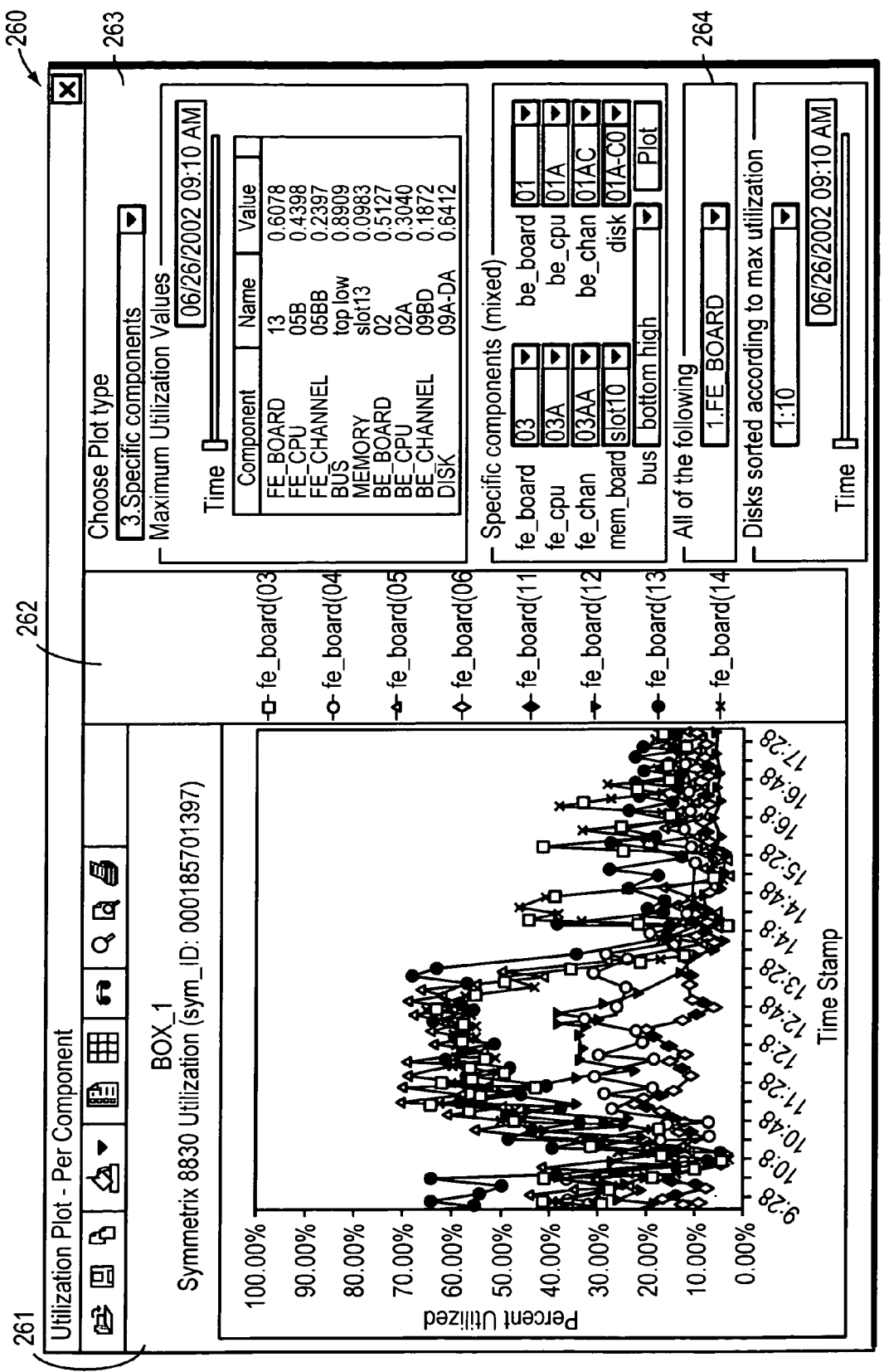
FIG. 13 is another exemplary representation of a user interface screen for allowing use of this invention.

Reference is made below to FIGS. 12-14. FIGS. 12 and 13 show a performance graph 254 and 256 on screens 250 and 260, respectively. FIG. 12 shows utilization for an entire data storage system, while FIG. 13 depicts what is visible for a user who selects a particular component, in general component selection 258 (FIG. 12) and 263 (FIG. 13) wherein in this example front-end boards for a preferred EMC Symmetrix data storage system are selected in field selection area 264 (also FIG. 13). For each screen, a toolbar 252 is located at the top of the screen. The toolbar contains buttons for performing tasks such as saving and printing the chart in a format generally known by users of operating systems such as Microsoft. The vertical axis on graphs 254 and 260 (FIGS. 12 and 13, respectively) represents resource utilization in percentages. The horizontal axis represents time periods for given workloads. The lines or performance curves in the graph show snapshots of the utilization data over specified time periods. FIG. 14 is a screen 280 showing a graphical map 282 of utilization of just the disks that are individually identified by volume identifier area 282. Area 284 allows user selection similar to that described above with reference to FIGS. 12 and 13.

When considering utilizations the following points are factored by the tool and the user may also consider when using the tool. Consider the following when analyzing utilizations. Loads and utilizations do not necessarily behave empirically in a linear manner. For example, if one measures a 60% utilization for a particular workload, adding 10% to this workload may result in a 90% utilization, not 70%, as one might expect. Therefore when analyzing utilization, it is good practice to consider granularity or resolution. Utilization calculation is based on reports, which average the data on a very large granularity, but real I/O bursts in a typical workload environment that a customer may see. In consideration of this the simulation tool offers through the user interface screens described herein two options: a "Balanced" option assumes the load to be evenly distributed between all the resources, and a "Per Component" option reports the actual utilization for each component. The analysis of the utilizations for a given data storage system may be different for different components. The X-axis on the Utilization charts warns the user of potential bottlenecks and various options and changes are allowed to reach desired optimization in view of the analysis.

Figure 16:
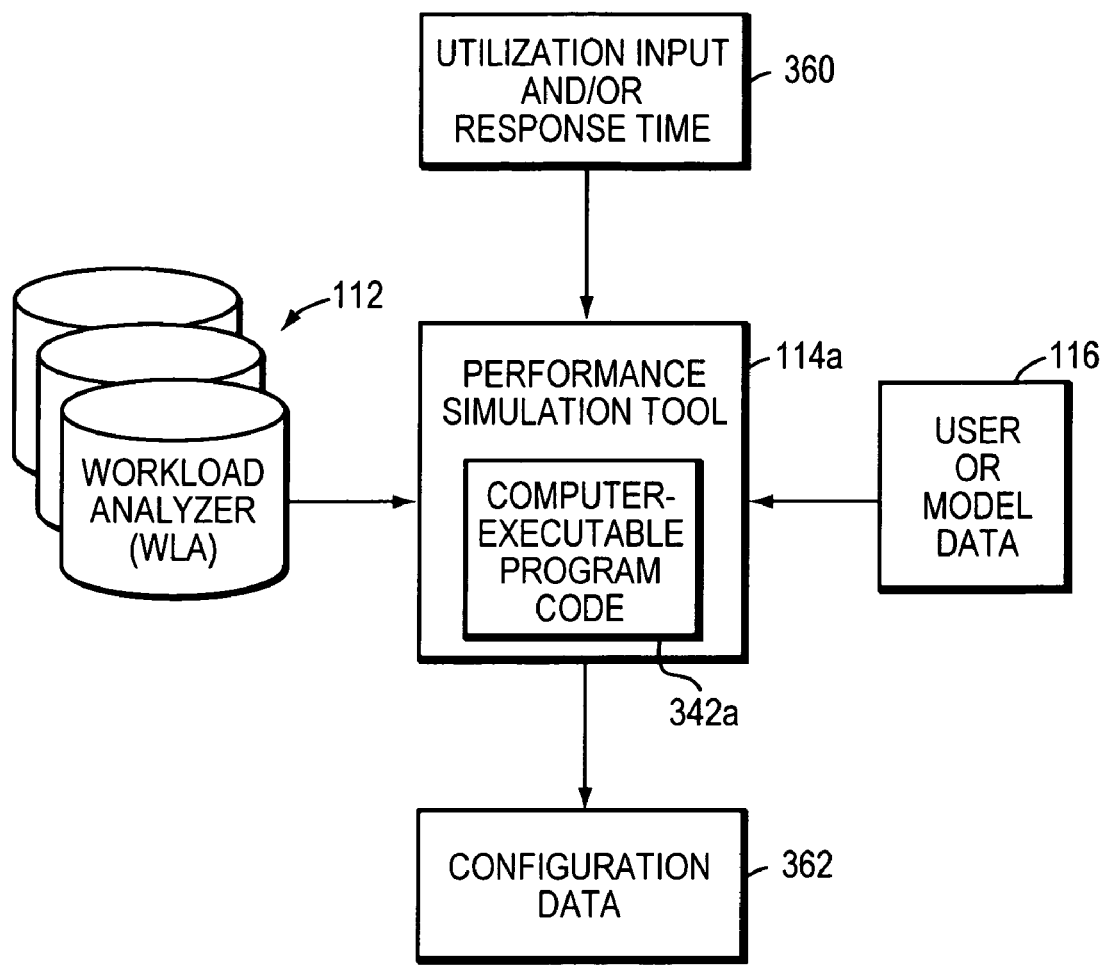
FIG. 16 shows an alternative embodiment of a computer-based tool that may be used to determine a configuration based on workload or utilization.

FIGS. 16-22 show an alternative embodiment wherein utilization and/or response of a system can be inputted into an alternative embodiment Performance Simulation Tool 114a and Computer Executable Program Code 342a (each shown in FIG. 16) that can be used for receiving the utilization and/or response time of a system and in turn recommend a number of preferred systems configurations to satisfy such use requirements. Also in this alternative embodiment workload data from the workload analyzer 112 and/or user or model data 116 may be inputted and analyzed as shown in FIG. 16. Calculating the utilization of a system (or in other words, calculating how busy a system is) is a complex calculation. The input required for such calculations includes the workload on the system and the exact configuration of the system. An embodiment of this invention discussed above in relation to FIGS. 1-15 provides this ability and allows a user to troubleshoot issues that a current system may have and also simulate a "what if" scenario by changing any of the input parameters and analyzing the utilization of the modified system. The inventors have also critically recognized a need for a different approach wherein input of the workload and required utilization of a system can be analyzed by the tool which recommends a number of substantially optimal system configurations that can sustain the requirements. This is the new invention is discussed below with reference to FIGS. 16-22. It should also be understood that the new Program Code 342a may also be implemented as part of computer-readable medium 352 and alternated with Computer Program Code 342 as shown on FIG. 15.

One problem that this alternative embodiment resolves is elimination of the need for a user to go through a number of iterations, where in each iteration he would be required to specify a configuration and analyze its utilization until he would hopefully converge into a satisfying solution, but not necessarily an optimal one. Such a prior art process would be time-consuming and require some proficiency and knowledge from the user that is lacking in the typical user, or is at least in short supply. This alternative embodiment is particularly advantageous when it is known that a data storage system will need to withstand a specified known workload. In such a case the user may simply choose and define a baseline from which he can fine-tune if other considerations are required.

Referring now to FIG. 16 to use the new alternative embodiment, utilization and/or response time input is made in functional-block 360 and passed to the performance simulation tool 114a including program code 342a which may also accept data from the workload analyzer 112 and/or user or model data 116 in an identical fashion as the embodiment described in FIG. 1. Then Configuration data is available from the tool based on the input after processing takes place as described below and as shown in functional block 362.

Figure 17:
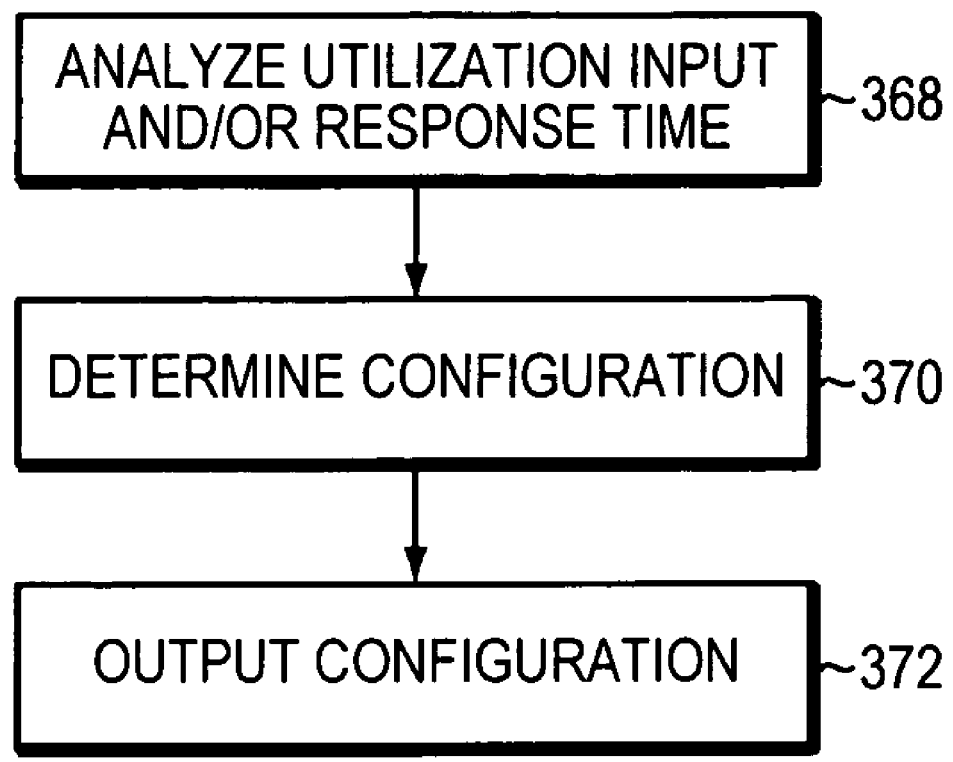
FIG. 17 shows an overview of a method of using the tool of FIG. 16.

The overall process is shown in concisely in FIG. 17. The utilization and/or response time requirements are analyzed from the input in step 368. The configuration is determined in step 370. The configuration is the given as output in step 372. Details and underlying concepts involved in these steps are now discussed below In addition to the workload or use requirements, total capacity is assumed to be given, and optionally the number of host ports may also be given. Such information is usually included in basic requirements and known where workload is known. Below is specified the procedure of analyzing the anticipated workload, computing the utilization of each system component, and determining the optimal configuration. In step 368, wherein the anticipated workload is analyzed the tool computes how much load each component in the workload is exerting on each system component. The workload components considered preferably include:

Read Hit: Percentage of I/Os that reread data from cache
Read Miss: Percentage of data that is read from disk in a random manner
Sequential Read: Data that is read sequentially, and, therefore, is prefetched in relatively large blocks.
Random Write: Percentage of I/Os that write data to a track not in cache
Rewrite: Percentage of I/Os that write data to a write-pending track
Sequential Write: Percentage of I/Os that write data sequentially, and, thus, give a chance to destage data in large blocks.

Next the step of analyzing the utilization input includes computing the utilization of each system component. In an exemplary EMC Symmetrix data storage system, the system components considered may include the number and storage capacity of storage disks, back-end directories, back-end processors, memory boards, front-end directors, and front-end processors. Once such parameters are given to the tool then the configuration can be determined in step 370 and given to the user as output in step 372.

FIG. 18 shows an exemplary data user input screen 380 identified as user data in filed 382, wherein input can be entered in the numerous data entry fields on field-area 384. In the shown example the total I/O rate is 5,000 with a total transfer rate of 93.75 MB/sec rate available. For given I/O rate percentages the I/O rate is given and the resulting transfer data rate (MBytes/Sec) and I/O size (kB), and the conditions of read-hit, read-miss, sequential read, re-write, and LRU writes under such conditions, and the user may use the convenient toggle slider in field 386 to adjust workload level between a heavy and light load. The user may then use radio-button 388 to input a preferred data storage system recommendation (referred to simply as cabinet) and more about the parameters entered here are discussed with reference to FIG. 19 below. In fields 390 and 392, the user may input the application type and number of mirroring disks (BCV refers to business continuance volumes in the exemplary Symmetrix data storage system). If all input is OK the user may so indicate using field 394.

In FIG. 19, the user may recommend cabinet inputs by defining the host ports and capacity, wherein such inputs are entered in field area 400. The user may choose to use this as the input used as the cabinet recommendation input prompted from field 388 (FIG. 18) in field 402, or cancel in field 404. Once this information is entered and OK is clicked on in field 394 (FIG. 18), the tool determines the configuration and outputs the configuration in the form of a report.

Such an exemplary report is shown below in Table 1.

TABLE 1

SymmMerge V3.06.010 - All results produced by this tool are performance estimates only The Recommendations within this report do not consider BCV, RDF, or Safety Factor.

Recommendations for DMX 1000 RAID 7 + 1 CH146LP
128 DISKS (16.35TB)
Configuration Details: DMX1000

| LRUs: | 8 | Buses: | 16 | | |
|---|---|---|---|---|---|
| Memory SizeGB: | 32 | BE Boards: | 2 | FE Boards: | 2 |
| Memory Boards: | 2 | BE CPUs: | 8 | FE CPUs: | 8 |
| Memory Areas: | 4 | BE Channels: | 16 | FE Channels: | 16 |
| RAID-R Cheetah | 146: | 128 | | | |

Maximum Utilizations:

| FE Board: | 11% | FE CPU: | 10% | FE Channel: | 4% |
|---|---|---|---|---|---|
| RA1 Board: | 0% | RA1 CPU: | 0% | RA1 Channel: | 0% |
| RA2 Board: | 0% | RA2 CPU: | 0% | RA2 Channel: | 0% |
| Bus: | 17% | Memory: | 13% | Disk: | 43% |
| BE Board: | 25% | BE CPU: | 33% | BE Channel: | 6% |

Performance Utilization is acceptable for DMX 1000 RAID 7 + 1 CH146LP 128 DISKS (16.35TB)

Figure 20:
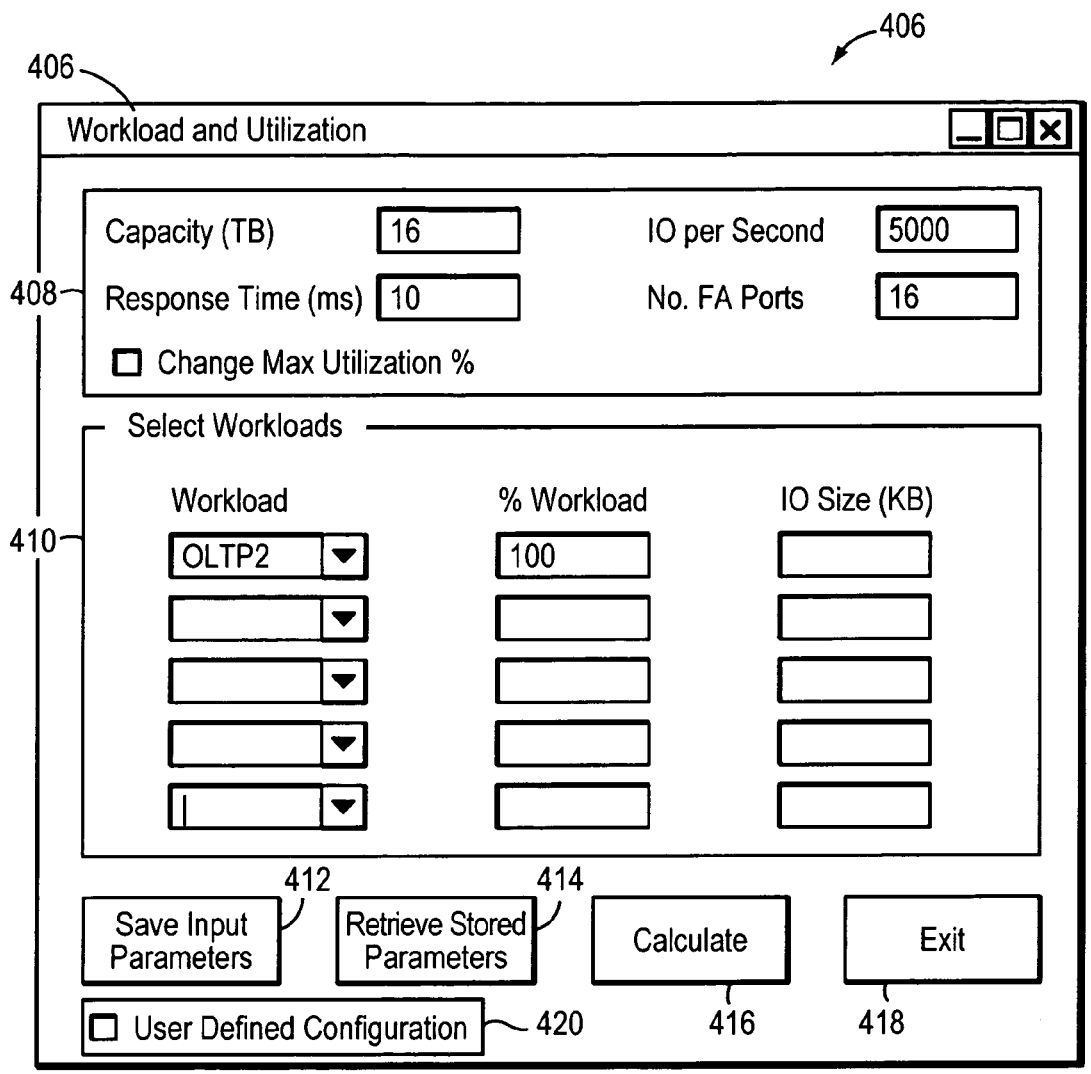
FIG. 20 shows another exemplary user data screen showing user data including user data input fields.

An exemplary interface user screen 406 for the tool is further shown in FIG. 20, including a title field area 406 indicating that workload and utilization are now considered. In field-area 408 the user may confirm the capacity, which in the example is 16 TB, the I/O per second of 5000, the acceptable response time of 10 ms, and no of front-end (FA) ports as 16. Maximum utilization may also be changed in this field-area. In field-area 410, workload may be selected, and parsed by application. In this example 100% of the workload is attributed to the OLTP2 database application. Input parameters may be saved using radio-button 412, or stored parameters may be retrieved by clicking on the button 414. The user may choose to click "calculate" or "exit" by clicking buttons 416 and 418, respectively.

Figure 21:
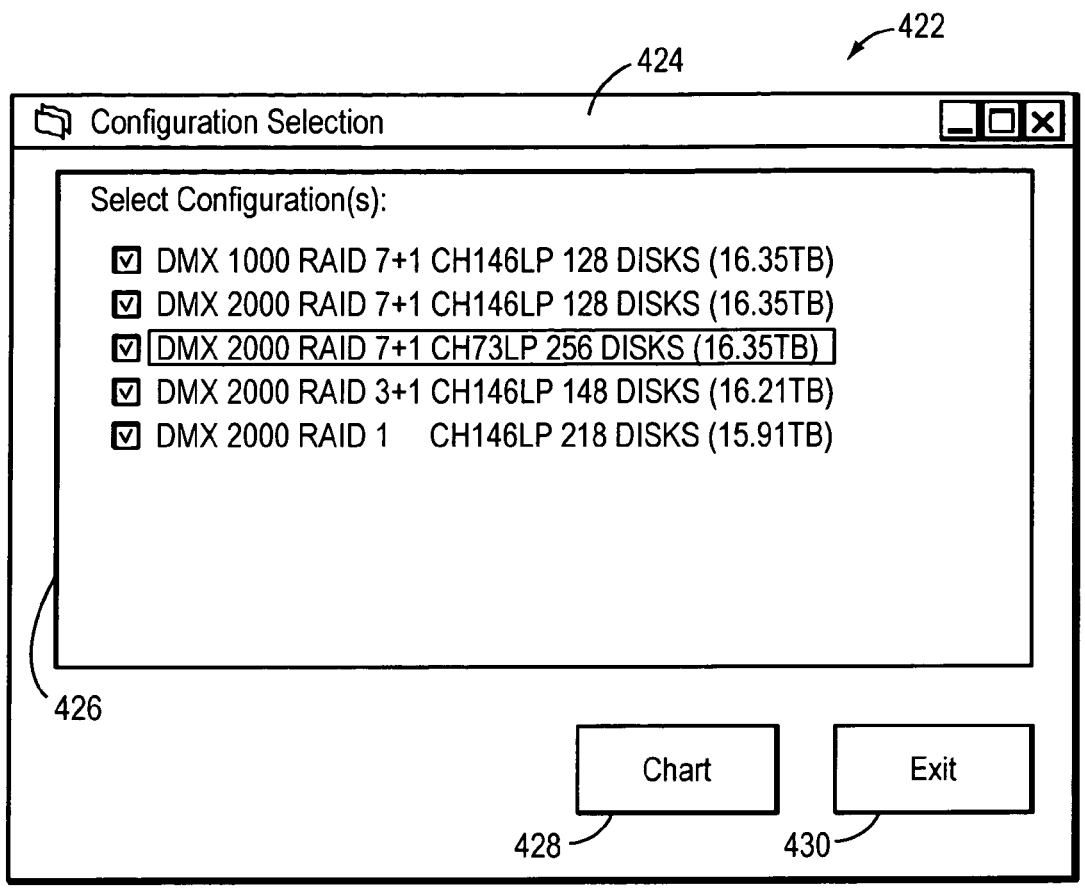
FIG. 21 shows another exemplary user data screen showing determined data including user data input selection fields.
Figure 22:
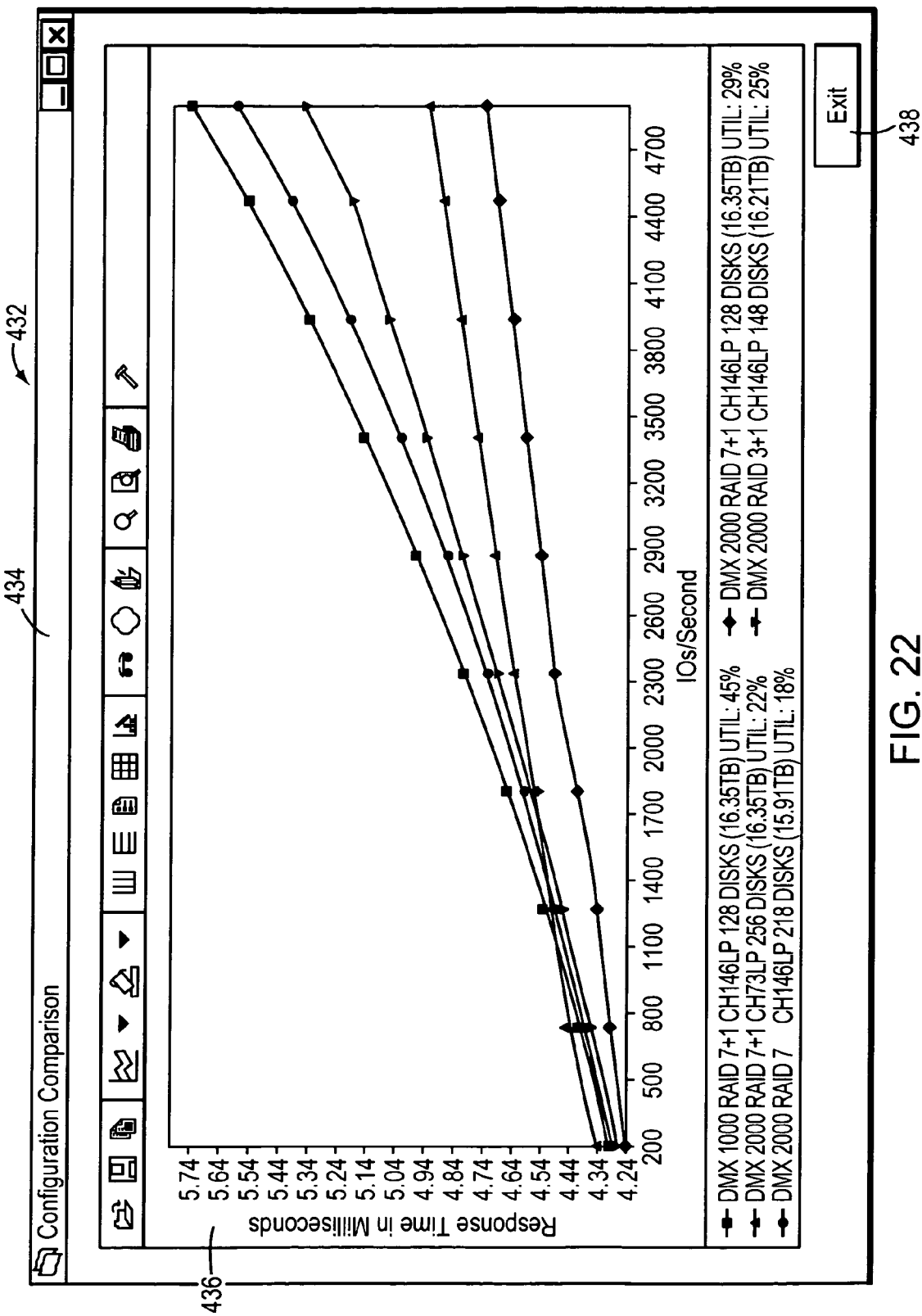
FIG. 22 shows a user display screen showing a comparison of configurations determined from user data input in FIGS. 18-21.

Reference is now made to FIGS. 21 and 22. FIG. 21 shows the user configuration selected after the user clicks "calculate. Screen 422 is entitled "Configuration Selection" in field 424 and several options are presented for the user in field-area 424, and for each that the users selects (shown in the example by a user placed check mark), the results are graphed to show a comparison in FIG. 22. FIG. 22 shows such a graph presented on user screen 432 entitled Configuration Comparison in field 434. Field area 436 shows a graph of each selectable configuration, wherein the plot key is shown related to each system at the bottom area of area 435. The plot of each configuration compares by showing the response time in milliseconds on the "Y" axis and the IO's per second on the "X" axis. User tools are available on the toolbar area at the top of field area 436. Given this information the user has good choices available for a configuration based on the workload requirements and may need only next to consider budget and such details to make a choice.

The inventors have critically recognized several uses and advantages for the alternative embodiment discussed in reference to FIGS. 16-22. One advantage is that such configuration information may be use to consolidate more than one old system into a new system, where the input is the utilization and or the response time required and may include the workload from all the old systems, and the out put will be the configuration of the proposed new storage system.

Another use involves analyzing one or more storage systems based on utilization, response time, or workload and then determining a recommended configuration that would overcome performance bottlenecks that might exist with a lower capacity system, while also not un-economically over-sizing the capacity needed. Thus the tool would not only indicate where a performance problem lies, but would also suggest a configuration that would resolve the issue by proposing a configuration that would sustain the load for a given required utilization, response time, or workload.

For example the tool could indicate that the back-end CPUs are highly utilized, causing some performance impact to the host applications. A trained user would know he needs to add more back-end CPUs and spread the workload across all the back-end, however, he would also have to iterate a number of different configurations until he would know how many back-end CPUs are required to sustain the workload. Implementing the present invention would be able to suggest the right number of back-end CPUs, which will guarantee a specified required utilization of the system.

A system and method for simulating performance and workload on one or more data storage systems and using such simulation information has been described. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A computer executed method for determining a configuration for a target data storage system includes the steps of:
receiving, from a user interface, identifiers of one or more source data storage systems, wherein each of the one or more data storage systems comprise a plurality of components, the plurality of components comprising a data storage device;
receiving utilization or response time data related to the one or more source data storage systems; wherein the utilization or response time data comprises utilization or response time for at least one of the plurality of components of the one or more source data storage systems;
receiving performance characteristics of work performed on the one or more source data storage systems; wherein the performance characteristics of work performed comprises performance characteristics of work performed for at least one of the plurality of components of the one or more source data storage systems; wherein the performance characteristics comprise I/O operations comprising a number of read hits, read misses, least recently used writes, and write pending operations;
receiving, from the user interface, a number of boxes corresponding to components to be included in a target data storage system, wherein components of the target data storage system are selected in response to the utilization and response time data;
determining a recommended configuration of the target storage system by analyzing the performance characteristics of and the utilization of the plurality of the selected components as applied to the selected components included in the target data storage system based on the number of boxes selected and the performance characteristics; and
displaying the recommended configuration of the target storage system.

2. The method of claim 1, wherein determining the configuration of the target data storage system includes:
determining the configuration of components of the target data storage system;
receiving, from the user interface, a change to the number of boxes in the target data storage system; and
reconfiguring the target data storage system in response to the change to the number of boxes, the utilization and response time and the performance characteristics.

3. The method of claim 2, wherein determining the configuration of components of the target data storage system is used for load balancing the performance of the target data storage system.

4. The method of claim 2, wherein determining the configuration of components of the target data storage system is used for determining the storage capacity of the target data storage system.

5. The method of claim 2, wherein determining the configuration of components of the target data storage system is used for at least partially optimizing performance of the target data storage system.

6. The method of claim 1, wherein determining the configuration of the target data storage system is used for load balancing the performance of the target data storage system.

7. The method of claim 1, wherein determining the configuration of the target data storage system is used for determining the storage capacity of the target data storage system.

8. The method of claim 1, wherein determining the configuration of the target data storage system is used for at least partially optimizing performance of the target data storage system.

9. A system for determining a configuration for a target data storage system comprising:
a computer having a memory and a display;
computer-executable program code operating in memory, wherein the computer-executable program code is configured for execution of the following steps:
receiving, from a user interface, identifiers of one or more source data storage systems, wherein each of the one or more data storage systems comprise a plurality of components, the plurality of components comprising a data storage device of the one or more source data storage systems;
receiving utilization or response time data related to the one or more source data storage systems; wherein the utilization or response time data comprises utilization or response time for at least one of the plurality of components;
receiving performance characteristics of work performed on the one or more source data storage systems, wherein the performance characteristics of work performed comprises performance characteristics of work performed for at least one of the plurality of components of the one or more source data storage systems; wherein the performance characteristics comprise I/O operations comprising a number of read hits, read misses, least recently used writes, and write pending operations;
receiving, from the user interface, a number of boxes to be included in a target data storage system;
determining a recommended configuration of the target storage system by on analyzing the performance characteristics of and the utilization of the plurality of the selected components as applied to the selected components included in the target data storage system based on the number of boxes selected and the performance characteristics; and
displaying the recommended configuration of the target storage system.

10. The system of claim 9, wherein determining configuration of the target data storage system includes:
  determining the configuration of components of the target data storage system;
  receiving, from the user interface, a change to the number of boxes in the target data storage system; and
  reconfiguring the target data storage system in response to the change to the number of boxes, the utilization and response time and the performance characteristics.

11. The system of claim 10, wherein determining the configuration of components of the target data storage system is used for load balancing the performance of the target data storage system.

12. The system of claim 10, wherein determining the configuration of components of the target data storage system is used for determining the storage capacity of the target data storage system.

13. The system of claim 10, wherein determining the configuration of components of the target data storage system is used for at least partially optimizing performance of the target data storage system.

14. The system of claim 9, wherein determining the configuration of the target data storage system is used for load balancing the performance of the target data storage system.

15. The system of claim 9, wherein determining the configuration of the target data storage system is used for determining the storage capacity of the target data storage system.

16. The system of claim 9, wherein determining the configuration of the target data storage system is used for at least partially optimizing performance of the target data storage system.

* * * * *